(12) United States Patent
Hoffman et al.

(10) Patent No.: US 11,347,963 B2
(45) Date of Patent: *May 31, 2022

(54) SYSTEMS AND METHODS FOR IDENTIFYING SEMANTICALLY AND VISUALLY RELATED CONTENT

(71) Applicant: Highspot, Inc., Seattle, WA (US)

(72) Inventors: Raphael Hoffman, Seattle, WA (US); Nate Dire, Seattle, WA (US); Erik Christensen, Shoreline, WA (US); Oliver Sharp, Seattle, WA (US); David Wortendyke, Seattle, WA (US); Scot Gellock, Seattle, WA (US); Robert Wahbe, Seattle, WA (US)

(73) Assignee: Highspot, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,798

(22) Filed: Jun. 17, 2020

(65) Prior Publication Data

US 2020/0334496 A1 Oct. 22, 2020

Related U.S. Application Data

(63) Continuation of application No. 15/985,222, filed on May 21, 2018, now Pat. No. 10,726,297, which is a
(Continued)

(51) Int. Cl.
*G06K 9/62* (2022.01)
*G06F 40/30* (2020.01)
(Continued)

(52) U.S. Cl.
CPC ........... *G06K 9/6215* (2013.01); *G06F 40/30* (2020.01); *G06K 9/6218* (2013.01); *G06V 30/414* (2022.01); *G06V 30/418* (2022.01)

(58) Field of Classification Search
CPC ............ G06K 9/6215; G06K 9/00463; G06K 9/6218; G06K 9/00483; G06F 40/30;
(Continued)

(56) References Cited

U.S. PATENT DOCUMENTS 6,751,600 B1 * 6/2004 Wolin ................... G06F 16/353
706/12
7,814,425 B1 10/2010 O'Shaugnessy
(Continued)

FOREIGN PATENT DOCUMENTS

JP 2012185780 A 9/2012

OTHER PUBLICATIONS

International Search Report and Written Opinion for International Application No. PCT/US2013/076962, dated Apr. 22, 2014, 11 pages.
(Continued)

*Primary Examiner* — Shaghayegh Azima
(74) *Attorney, Agent, or Firm* — Perkins Coie LLP

(57) ABSTRACT

Systems and methods for identifying semantically and/or visually related information among a set of content items, such content items that include similar concepts or that have similar visual aspects, are disclosed. The disclosed techniques provide tools for identifying related information among various content items, such as text pages and documents, presentation slides and slide decks, etc. The disclosed techniques provide improved methods for searching among content items, organizing content items into categories, and pruning redundant content. Furthermore, the disclosed techniques provide improvements to computation of various metrics, including usage, performance, and impact metrics.

20 Claims, 22 Drawing Sheets

Related U.S. Application Data continuation of application No. 15/004,693, filed on Jan. 22, 2016, now Pat. No. 9,984,310.

(60) Provisional application No. 62/107,283, filed on Jan. 23, 2015.

(51) Int. Cl.
*G06V 30/414* (2022.01)
*G06V 30/418* (2022.01)

(58) Field of Classification Search
CPC ........ G06F 2209/463; G06F 3/00; G06F 9/46; G06F 9/465; G06F 9/541; G06F 17/30029; G06F 17/30241; G06F 17/3087; G06F 19/00
See application file for complete search history.

(56) References Cited

U.S. PATENT DOCUMENTS

| | | | |
|---|---|---|---|
| 7,970,721 B2 | 6/2011 | Leskovec et al. | |
| 8,014,634 B1 | 9/2011 | Chan | |
| 8,402,375 B1 | 3/2013 | Skare | |
| 8,447,760 B1* | 5/2013 | Tong | G06F 16/355 707/728 |
| 8,510,313 B2 | 8/2013 | Vaughan | |
| 8,554,601 B1 | 10/2013 | Marsh | |
| 8,655,709 B2* | 2/2014 | Kumaran | G06Q 10/0637 705/7.36 |
| 8,872,804 B2 | 10/2014 | Cummings | |
| 9,727,618 B2* | 8/2017 | Sharp | G06F 16/34 |
| 2002/0091991 A1* | 7/2002 | Castro | G06F 9/06 717/106 |
| 2004/0267700 A1 | 12/2004 | Dumais | |
| 2005/0267799 A1 | 12/2005 | Chan et al. | |
| 2006/0085427 A1 | 4/2006 | D'Urso | |
| 2006/0129538 A1* | 6/2006 | Baader | G06F 16/951 |
| 2006/0248045 A1 | 11/2006 | Toledano | |
| 2007/0033517 A1 | 2/2007 | O'Shaugnessy | |
| 2007/0079384 A1 | 4/2007 | Grinstein | |
| 2007/0088583 A1* | 4/2007 | Chen | G06Q 10/06 705/7.27 |
| 2007/0088820 A1 | 4/2007 | Kwak | |
| 2007/0150515 A1 | 6/2007 | Brave et al. | |
| 2007/0240203 A1* | 10/2007 | Beck | G06F 21/6245 726/4 |
| 2008/0140684 A1* | 6/2008 | O'Reilly | G06F 16/353 |
| 2008/0154873 A1 | 6/2008 | Redlich | |
| 2008/0306954 A1 | 12/2008 | Hornqvist | |
| 2008/0313716 A1* | 12/2008 | Park | H04L 63/104 726/4 |
| 2009/0019026 A1 | 1/2009 | Valdes-Perez et al. | |
| 2009/0063475 A1* | 3/2009 | Pendse | G06Q 30/0256 |
| 2009/0106697 A1 | 4/2009 | Ward | |
| 2009/0164431 A1* | 6/2009 | Zivkovic | G06Q 10/10 |
| 2009/0178144 A1 | 7/2009 | Redlich | |
| 2009/0222551 A1 | 9/2009 | Neely | |
| 2010/0070488 A1 | 3/2010 | Sylvain | |
| 2010/0076274 A1* | 3/2010 | Severson | G16H 10/60 600/300 |
| 2010/0082622 A1 | 4/2010 | Irie | |
| 2010/0146593 A1 | 6/2010 | Stahl | |
| 2010/0198869 A1 | 8/2010 | Kalaboukis et al. | |
| 2010/0235351 A1 | 9/2010 | Iwasa et al. | |
| 2010/0250556 A1 | 9/2010 | Park | |
| 2010/0281389 A1 | 11/2010 | Hutchinson | |
| 2011/0107260 A1 | 5/2011 | Park | |
| 2011/0161362 A1* | 6/2011 | Lipscombe | G06Q 30/02 707/769 |
| 2011/0191679 A1 | 8/2011 | Lin | |
| 2011/0225153 A1 | 9/2011 | Haseyama | |
| 2011/0238754 A1* | 9/2011 | Dasilva | G06F 16/7867 709/204 |
| 2011/0251875 A1 | 10/2011 | Cosman | |
| 2012/0001919 A1* | 1/2012 | Lumer | H04L 67/22 345/440 |
| 2012/0066645 A1 | 3/2012 | Laurie | |
| 2012/0117475 A1* | 5/2012 | Lee | G06F 16/338 715/733 |
| 2012/0131495 A1 | 5/2012 | Goossens | |
| 2012/0143859 A1* | 6/2012 | Lymperopoulos | G06F 16/9537 707/724 |
| 2012/0143880 A1 | 6/2012 | Sweeney | |
| 2012/0158751 A1* | 6/2012 | Tseng | G06F 16/9535 707/751 |
| 2012/0191715 A1 | 7/2012 | Ruffner | |
| 2012/0197855 A1 | 8/2012 | Chen | |
| 2012/0271819 A1 | 10/2012 | Qiu et al. | |
| 2012/0278761 A1 | 10/2012 | John | |
| 2012/0278329 A1 | 11/2012 | Borggaard et al. | |
| 2012/0290565 A1* | 11/2012 | Wana | G06F 16/958 707/723 |
| 2012/0290614 A1 | 11/2012 | Nandakumar et al. | |
| 2012/0310926 A1 | 12/2012 | Gannu et al. | |
| 2012/0313948 A1* | 12/2012 | Bergman | G06Q 50/01 345/440 |
| 2013/0036114 A1* | 2/2013 | Wong | G06F 16/9535 707/732 |
| 2013/0054583 A1* | 2/2013 | Macklem | G06F 16/9535 707/723 |
| 2013/0110813 A1 | 5/2013 | Holm et al. | |
| 2013/0124653 A1* | 5/2013 | Vick | H04L 51/32 709/206 |
| 2013/0218923 A1* | 8/2013 | Kaul | G06F 16/245 707/769 |
| 2013/0226995 A1* | 8/2013 | Etheredge | F15B 13/044 709/203 |
| 2013/0254280 A1* | 9/2013 | Yang | G06Q 30/0201 709/204 |
| 2013/0262588 A1 | 10/2013 | Barak et al. | |
| 2013/0268479 A1 | 10/2013 | Andler | |
| 2013/0297582 A1 | 11/2013 | Zukovsky | |
| 2013/0297590 A1* | 11/2013 | Zukovsky | G06F 16/248 707/722 |
| 2013/0325858 A1 | 12/2013 | Xu | |
| 2014/0006399 A1 | 1/2014 | Vasudevan | |
| 2014/0019497 A1* | 1/2014 | Cidon | G06F 16/182 707/827 |
| 2014/0040246 A1 | 2/2014 | Rubinstein et al. | |
| 2014/0089048 A1* | 3/2014 | Bruich | G06Q 30/0201 705/7.32 |
| 2014/0089402 A1 | 3/2014 | Liyanage | |
| 2014/0164338 A1* | 6/2014 | Hickman | G06F 16/256 707/692 |
| 2014/0181204 A1* | 6/2014 | Sharp | H04L 67/22 709/204 |
| 2014/0189516 A1 | 7/2014 | Guo | |
| 2014/0280629 A1 | 9/2014 | Rubinstein et al. | |
| 2014/0359424 A1 | 12/2014 | Lin | |
| 2015/0046528 A1* | 2/2015 | Piepgrass | G06F 15/17306 709/204 |
| 2015/0177933 A1 | 6/2015 | Cueto | |
| 2015/0213204 A1* | 7/2015 | Bose | G16Z 99/00 705/3 |
| 2016/0042253 A1 | 2/2016 | Sawhney | |
| 2016/0162591 A1* | 6/2016 | Dokania | G06F 16/954 707/738 |
| 2016/0196336 A1* | 7/2016 | Allen | G06F 16/9535 707/734 |
| 2016/0231884 A1* | 8/2016 | Plakhov | G06F 3/0481 |
| 2018/0293306 A1 | 10/2018 | Park | |

OTHER PUBLICATIONS

International Search Report and Written Opinion for International Application No. PCT/US2014029505, dated Jul. 7, 2014, 11 pages.
Screenshot of main page of Speaker Deck website. Taken Dec. 10, 2014 https://speakerdeck.com/.

(56) References Cited

OTHER PUBLICATIONS

Screenshot of Frequently Asked Questions page of Speaker Deck website. Taken Dec. 10, 2014 https://speakerdeck.com/faq#file_types.

* cited by examiner

| Slide Family | # | Usage | | | Customer Engagement | | | | Business Impact | | | | |
|---|---|---|---|---|---|---|---|---|---|---|---|---|---|
| | | Views | Bulk Mails | Pitches | Customer Views | Dwell Time | Open Rate | MQLs Influenced | Won Deals Influenced | Revenue Influenced | Conversion Velocity Uplift | Conversion Rate Uplift |
| [310] | 6 | 232 | 1090 | 52 | 44 | 117 min | 44% | 44 | 12 | $2.4 million | 18% | 5% |
| [320] | 4 | 155 | 543 | 66 | 32 | 109 min | 29% | 21 | 6 | $0.9 million | 6% | 1% |

Figure 16: Screen Shot of Basic Search

*FIG. 18*

SYSTEMS AND METHODS FOR IDENTIFYING SEMANTICALLY AND VISUALLY RELATED CONTENT

RELATED APPLICATIONS

This application is a continuation of U.S. patent application Ser. No. 15/985,222, filed May 21, 2018, entitled SYSTEMS AND METHODS FOR IDENTIFYING SEMANTICALLY AND VISUALLY RELATED CONTENT, which is a continuation of U.S. patent application Ser. No. 15/004,693, filed Jan. 22, 2016, entitled SYSTEMS AND METHODS FOR IDENTIFYING SEMANTICALLY AND VISUALLY RELATED CONTENT, which claims the benefit of U.S. Provisional Patent Application No. 62/107,283 filed Jan. 23, 2015, entitled SYSTEMS AND METHODS FOR IDENTIFYING SEMANTICALLY AND VISUALLY RELATED CONTENT, all of which are herein incorporated by reference in their entireties. This application is related to U.S. patent application Ser. No. 14/566,515 filed Dec. 10, 2014, entitled SKIM PREVIEW; U.S. Provisional Patent Application No. 61/914,266 filed Dec. 10, 2013, entitled SKIM PREVIEW; U.S. Provisional Patent Application No. 61/745,365, filed Dec. 21, 2012, entitled INTEREST GRAPH-POWERED SEARCH; U.S. Non-provisional patent application Ser. No. 14/136,322, filed Dec. 20, 2013, entitled INTEREST GRAPH-POWERED SEARCH; U.S. Provisional Patent Application No. 61/800,042 filed Mar. 15, 2013, entitled INTEREST GRAPH-POWERED FEED; U.S. Non-provisional patent application Ser. No. 14/214,140, filed Mar. 14, 2014, entitled INTEREST GRAPH-POWERED FEED; U.S. Provisional Patent Application No. 61/800,322, filed Mar. 15, 2013, entitled INTEREST GRAPH-POWERED BROWSING; U.S. Non-provisional application Ser. No. 14/213,505 filed Mar. 14, 2014, entitled INTEREST GRAPH-POWERED BROWSING; U.S. Provisional Patent Application No. 61/800,497 filed Mar. 15, 2013, entitled INTEREST GRAPH-POWERED SHARING; U.S. Non-provisional patent application Ser. No. 14/213,983 filed Mar. 14, 2014, entitled INTEREST GRAPH-POWERED SHARING; and U.S. Provisional Patent Application No. 62/037,956 filed Aug. 15, 2014, entitled NEWS FEED, all of which are herein incorporated by reference in their entireties.

BACKGROUND

Businesses, government entities, groups of people, and other types of organizations are capable of generating massive amounts of content on a daily basis. Furthermore, this content can easily be copied, modified, shared, and republished in different contents nearly as quickly. For example, documents may be edited, slides of a presentation deck may be re-arranged, a slide from one presentation deck may be re-used in other presentation decks, and so on. When one portion of content (e.g., a slide or page) is copied from one content item (e.g., a presentation deck or word processing document) to another, it is not considered the same portion of content by document management systems. Furthermore, when these content elements are edited, other aspects of the content element may remain unchanged and, therefore, the pre- and post-edited elements may remain semantically and/or visually similar. However, document management systems track usage and other statistics related to the two copies separately even though they contain the same information. Keeping separate metrics for these two portions of content dilutes the quality of metrics, which can be made even worse each time the content is copied or a new version is created.

Currently, internal networks within organizations do not automatically find the information or data (e.g., business information) that employees need to do their jobs and present it for discovery. Intranet services do not gather information about users, search through information available across the company, and find the most relevant documents and other business information. Users must seek out the information they need and are often left unaware of highly relevant information that they could benefit from.

BRIEF DESCRIPTION OF THE DRAWINGS

FIG. 3 is a display page showing a report representative of the performance of a set of slides, grouped together into "families" in accordance with some examples of the disclosed technology.

FIG. 13 is a display page illustrating a sub-collection of information called a "spotlist."

FIG. 18 is a display page illustrating sharing via discovery.

DETAILED DESCRIPTION

Figure 1:
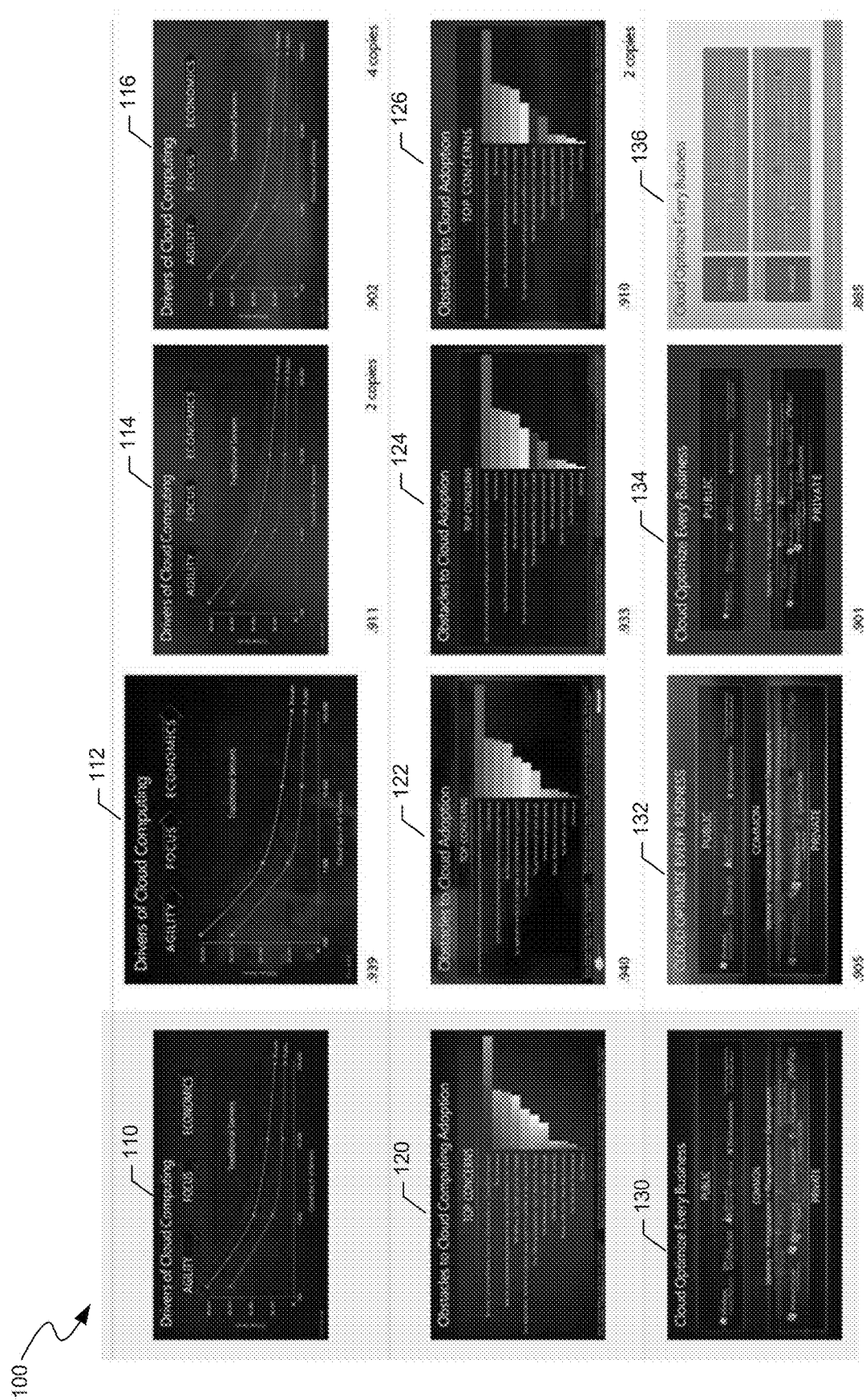
FIG. 1 is a display page showing how, for a given set of presentation slides (left column), semantically and/or visually similar slides are shown (to the right) in some embodiments of the disclosed technology.

Various examples of the technology will now be described. The following description provides certain specific details for a thorough understanding and enabling description of these examples. One skilled in the relevant technology will understand, however, that the disclosed technology may be practiced without many of these details. Likewise, one skilled in the relevant technology will understand that the disclosed techniques may include many other features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the disclosed technology. Indeed, certain terms may even be emphasized below; however, any terminology intended to be interpreted in any restricted manner will be overtly and specifically defined as such in this Detailed Description section.

Identifying Semantically and Visually Related Content

Systems and methods for identifying semantically and/or visually related information, such as content items that include similar concepts or that have similar visual aspects, are disclosed. The disclosed techniques provide tools for identifying related information among various content items, such as text pages and documents, presentation slides and decks, and so on. The disclosed techniques provide improved methods for searching among content items, organizing content items into categories, pruning redundant content, and so on. Furthermore, the disclosed techniques provide improvements to the computation of various metrics, including usage, performance, and impact metrics.

In some embodiments, the disclosed system is part of a content management service system that allows users to add and organize files, including presentation decks, word processing documents, images, and so on. The content can be provided to the content management service system in any number of ways, such as uploaded from a computer, imported from cloud file systems, added via links (e.g., a URL to a location on a remote server or storage system), and so on. The content management service system provides the ability to search, browse for related content, organize the content into categories, prune redundant content, and so on.

In some embodiments, the disclosed techniques allow content to be selected and provided or made available to customers who can then engage with the content. The content management service system measures this engagement through a variety of metrics and uses these metrics to drive usage, performance, and impact analytics:

Usage analytics measure the degree to which slides were provided or made available to and viewed by customers. One example usage metric is the number of times a content item was pitched to customers.

Performance analytics measure the degree to which customers have engaged with (e.g., read, edited, shared, saved) the pitched content. Metrics include the dwell time on an item, such as the amount of time that the content was displayed in a content viewer (e.g., web browser or other application) as obtained by, for example, a web analytics tracker.

Impact analytics tie the content to business metrics. For example, one business metric is the average revenue per pitch of a content item. Some business metrics can be obtained from other systems, such as customer relationship management (CRM) systems, marketing automation systems, and so on.

In some embodiments, the content management service system generates these metrics for each content item. When users search for content or browse related content, they can also investigate these metrics.

In some embodiments, the disclosed techniques enable searching and browsing related content, and investigating metrics can be enabled on various levels of granularity, such as corpus level, document level, slide level in the case of presentation slides, page level for documents, chapter level for books, section level for periodicals, and so on. Enabling these operations on varying levels of granularity is particularly important within organizations due to how content evolves over time: documents may be edited, slides of a presentation deck may be re-arranged, and a slide from one presentation deck may be re-used in other presentation decks. Furthermore, when content is copied, it may be modified slightly by the user or automatically modified by software based on, for example, a "theme" being used. For example, when a slide from one presentation deck is copied from one presentation deck to another, the slide may be modified based on a color scheme in the new or target slide even though the substantive content of the slide does not change. Furthermore, different users may, independently from each other, create semantically similar content items. While individual slides may be very similar, the containing presentation decks may be different.

In some embodiments, the content management service system uses the analytic techniques described herein to identify when content, slides, slide decks, or groups thereof are variations on one another based on semantic and/or visual similarities. The system can present the variations of semantically and visually related content items grouped together. Furthermore, the content management service system can show usage, performance, and impact metrics with the content, thus making users aware not only of the existence of related content but also, for example, the degree of customer engagement with these variations (individually and/or collectively). When the similarity measurement between two different content items exceeds a predetermined threshold, keeping metrics separate may dilute the quality of the metrics. In such cases, the metrics can be aggregated over clusters of similar content.

The disclosed system and methods include components for:

Applying these techniques within a business or other kind of organization where the users have shared goals and a shared body of content.

Finding exact duplicates of slides or pages (from potentially different decks or documents) and collapsing them for an enhanced browsing experience.

Identifying slides or pages similar to a given query slide or page, and decks or documents similar to a given query deck or document. This is useful when a user has already found a relevant slide or deck (or page or document) and is interested in exploring semantically and visually similar variations.

Creating clusters over all slides or decks (or pages, documents, etc.). There may be many sets of slides or decks (or pages, documents, etc.) that are semantically and/or visually very similar.

Applying analysis to a wide range of features extracted from presentation decks. Presentations can be stored in a variety of formats, including PPTX (MICROSOFT POWERPOINT) and PDF (PORTABLE DOCUMENT FORMAT). They may contain text at various font sizes, embedded images, and other embedded objects. Any or all these features can be used to determine similarity.

Assisting users in organizing their content into categories by displaying semantically and visually similar content.

Assisting users in pruning redundant content by displaying semantically and visually similar content.

Generating reports of usage, performance, and usage analytics of content, and aggregating these metrics over clusters of similar content items.

User Experience

Viewing Slides Similar to a Query Slide

In some embodiments, the system applies the disclosed techniques to help users of a content management service system find variations of a given presentation slide (i.e., a query presentation slide), a given presentation slide deck (i.e., query deck), or other form of content (i.e., query content).

FIG. 1 is a display page 100 illustrating how, for a given set of presentation slides 110, 120, and 130, semantically and/or visually similar slides 112-116, 122-126, and 132-136 are presented. To the right of each given slide, similar slides are shown in order of decreasing similarity. The value under each slide is a similarity measurement, ranging between 0 (meaning no measured similarity) to 1 (meaning identical). As can be seen, the system is able to determine that slides have a high degree of similarity, even when 1) there are different text shades and/or fonts and 2) diagrams and/or backgrounds have been modified. In this example, near duplicate slides (i.e., slides whose similarity measure exceeds a predetermined threshold (e.g., 0.5, 0.75, 0.95, 0.999) determined by a user or automatically) are grouped and only one copy is displayed.

It is not uncommon that an exact copy of a slide is used in multiple slide decks. To enhance the browsing experience, duplicate slides are grouped and only one copy is shown. In this example, for slides with exact duplicates, the number of duplicates is shown below it. Similarly, the disclosed techniques can be applied to other forms of media, such as books, periodicals, etc.

Viewing Decks Similar to a Query Deck

In some embodiments, the disclosed system applies these techniques to find variations of a given presentation deck. While the user experience is the same as in the case of slides, each content item in the interface represents a deck, and similarities are computed considering the entire content of the deck.

Viewing Clusters of Similar Slides

In some embodiments, the system applies these techniques to a content management service system to create a clustering over all slides based on calculated similarity measurements. Such a global clustering can enhance a user's browsing experience, as similar slides can be grouped together.

Figure 2:
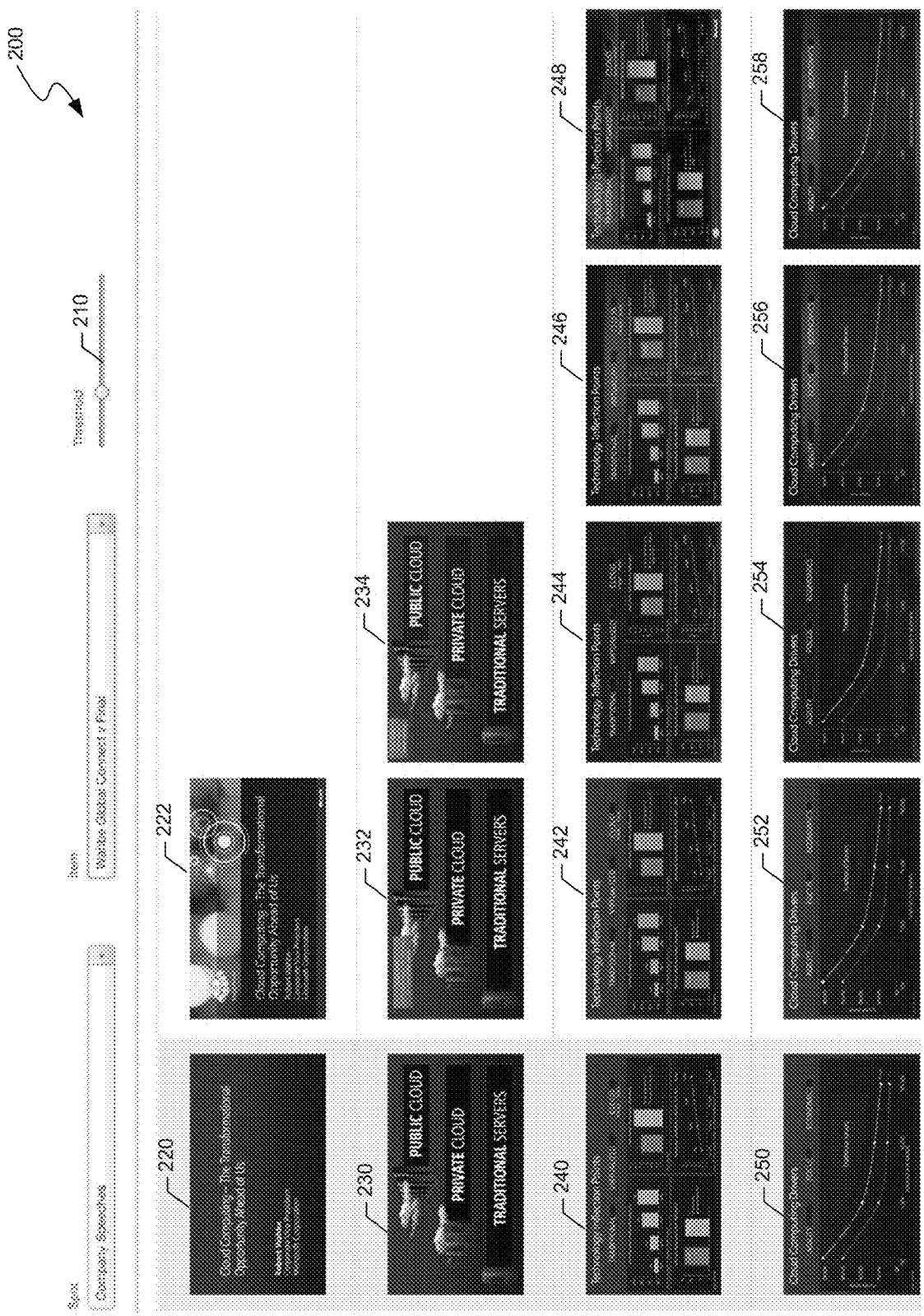
FIG. 2 is a display page illustrating a tool to generate and explore global clusters of presentation slides in accordance with some examples of the disclosed technology.

FIG. 2 is a display page 200 illustrating a tool for exploring clusters over all slides at various similarity thresholds. A user can move the slider 210 at the top of the page to adjust a similarity threshold used to decide whether two clusters should be merged (i.e., adjusting the similarity threshold). The system may refresh the clustering view in real-time. In this example, each of slides 220, 230, 240, and 250 are shown on the left end of a row of semantically and/or visually similar slides 222, 232-234, 242-248, and 252-258 based on the threshold value selected via slider 210. In this case, although the slides in each row have differences, they have still been determined to be visually and/or semantically similar based on various attributes of these slides, such as color, font, text, formatting, layout, etc. Sliding the slider to increase the threshold value may cause the system to generate a new row for one or more slides that no longer satisfy the threshold. Conversely, decreasing the threshold value may case the system to collapse one or more rows into each other.

This view lets users quickly explore which slides have many variations. The system can also aggregate usage, performance, and impact metrics over each cluster, and re-order the clusters accordingly. This allows users to easily identify clusters of semantically and visually similar slides, which taken together have high customer engagement.

Viewing Clusters of Similar Decks

In some embodiments, the system applies the disclosed techniques to create clusters over presentation decks. Again, the user experience is the same as in the case of slides, but similarities are computed using the entire content of the decks.

Viewing Performance of Slide Clusters

In some embodiments, the system applies the disclosed techniques to create a report of performance of clusters of slides. FIG. 3 is a display page 300 showing a report representative of the performance of a set of slides, grouped together into "families." In this example, each row represents one cluster of similar slides, called a "Slide Family," with the most commonly used slide one shown as a thumbnail. For example, the system may capture an image of the most commonly used slide and resize the captured image to generate a thumbnail. In this example, the report indicates the number 360 of slides in the family, and then shows measures of usage 330, performance or customer engagement 340, and business impact 350 for the corresponding family of slides.

In this example, usage 330 measures how much activity inside the organization was associated with this slide family (e.g., how many times slides of the slide family were viewed, how many times decks of a slide family were sent out containing a slide of the slide family in a bulk mailing to potential or actual customers, how many times a slide of a slide family was part of a deck that was pitched to one or more customers directly by a salesperson). There are other measures of usage that could be tracked, such as the amount of time internal users interacted with slides of a slide family or decks of a deck family (sometimes known as "dwell time"), the number of times they copied or downloaded slides of a slide family or decks of a deck family, the number of comments they left about slides of a slide family or decks of a deck family, and the like.

Customer engagement 340 measures how much activity customers engaged in when sent a pointer to decks containing this slide family. In this example, three such measures are shown: 1) how often the customer viewed members of the slide family, 2) how much time they spent looking at members of the slide family ("dwell time"), and 3) how often they opened members of the slide family when a member of the slide family was sent to them ("open rate"). Other measures could be tracked, such as the amount of time it took for them to react after a member of the slide family was sent, the number of times a customer requested to be unsubscribed from a mailing list when an email containing a member of the slide family was sent, etc.

Business impact 350 measures how much a particular slide or family of slides have impacted business measures.

In this example, there are five business impact metrics shown: 1) the number of marketing qualified leads (MQLs) that were influenced by having seen members of the slide family, 2) the number of successful deals that were influenced, 3) the amount of revenue those deals generated, 4) the increase in speed of conversion between sales stages when members of the slide family were sent, and 5) the increase in the rate of conversion when this piece of content was sent. Many other business metrics could be tracked, such as the conversion rate and velocity of the sales stage the deal was in, the number of sales qualified leads (SQLs) that were influenced, and so forth.

In some embodiments, the system comprises:
An ingestion system that analyzes new content, splitting presentation decks into individual slides, and extracting a variety of information that is useful for later determining the similarity of slides as well as decks.
A similarity analysis system that uses this information to compute similarity scores of pairs of content items, as well as global clusters of all content items. These clusters allow for the aggregation of metrics from individual items to their clusters.

Ingestion System

In some embodiments, the system processes new content as it is added or otherwise made available to the system. In some cases, presentation decks can be automatically detected and analyzed separately. Each deck can be split into individual slides, and a variety of semantic and visual information is extracted.

Presentation decks and other documents can be stored in a variety of formats. For example, MICROSOFT POWERPOINT'S PPTX and PPT formats are common but so is ADOBE's PDF format, which is often used to share documents that may have been created using a wide range of software applications, MICROSOFT'S DOC format, and so on. Formats such as PDF, however, are also frequently used for documents that do not contain presentation slides. In such cases, the system may automatically determine if the document is likely to contain presentation slides, based on properties such as aspect ratio or other visual characteristics. It is also possible to take into account other signals, such as formatting and content.

In some embodiments, the system parses each document, determines individual slides, and extracts information from these slides. This processing can be performed separately for each document format. While it is possible to convert documents in formats such as PPTX and PPT to PDF and engineer an ingestion process only for the latter, this approach can lead to lower quality results as some information is only available in the source documents. The system may also use a hybrid approach in which each presentation deck is converted to PDF, and then both PDF and, where available, PPT and PPTX, can be used to extract information.

The following types of information can be extracted:
A thumbnail image showing a rendering of the slide.
For each embedded image, the binary representation of the image.
The text appearing on the slide and/or snippets thereof.
Formatting information including font sizes.
PowerPoint tags indicating text snippets representing title, subtitle, slide numbers, headers, and footers.

Some of that information is likely to represent a better semantic or visual summary of the slide or deck than other information. For example, a word appearing in the title may be more relevant than a word appearing in the footer. The system therefore computes a set of relevant semantic and visual features from this information including, for example, titles, footers, text related to diagrams or images, text within a table, text in the foreground and/or background, and so on. Some features are marked with a boost, indicating that it should be given more or less weight. For example, words and snippets with font sizes larger than average or marked as title can be boosted (e.g., 3×) and words in the footer can be reduced (e.g., 0.5×). These boosts can be set manually or trained based on manual feedback about slides being similar or not.

Features may include exact snippets of text as well as tokens such as words contained in these snippets. Tokens can be obtained using Apache's Lucene or another tokenizer.

It is common for users to re-use images when creating slides. For example, icons, company logos, charts, and diagrams are frequently copied because it is not easy or necessary to re-create them. In some embodiments, the system takes into account such image re-use by including hashes of the embedded images as features so that each image does not have to be analyzed visually each time.

In many cases, users re-use entire slides in different presentation decks. Such duplicates can have a negative impact on the user experience when a user searches for variations of a given slide but needs to find these variations among a large number of duplicates. The system therefore may detect duplicates by computing a hash on the slide thumbnail and comparing this hash to hashes computed for other slide thumbnails.

Similarity Analysis System

The system periodically (e.g., once per minute, hour, day, week, month) invokes a process that computes the similarity between slides and decks, and stores each item's nearest neighbors (e.g., the top five most similar slides or decks) as well as clusters of items.

Similarity

To find similar content items, a similarity function over items is defined. In some examples, similarity function(s) may be generated by presenting content items of a training set of content items to one or more users and receiving similarity scores from the users based on a) the similarity of content elements and/or b) regions of content elements and performing a regression analysis of the produced similarity scores. In some examples, the component may apply functions that measure quantifiable differences between content items or content elements, such as the number of words, the number of matching words, pixel color values, width and/or height dimensions, font size, or some combination thereof. Using these values, a similarity score between two content items, content elements, or regions of a content element (A and B) can be determined by calculating the distance between these attributes according to the following equation:

$$\sqrt{\sum_{i=0}^{n} (A_i - B_i)^2}$$

where $A_i$ represents the $i^{th}$ attribute value for A, $B_i$ represents the $i^{th}$ attribute value for B, and n represents a number of attributes. Each item is represented by its features, which have been extracted during ingestion. Many similarity functions are possible; one approach is to first apply a TF/IDF (term frequency-inverse document frequency) weighting on features, and then use the cosine similarity function. An alternative would be to use the inverse Euclidean distance over the feature vectors. Note that some features may have been marked with a boost, as described above. In this case, the weights to account for these boosts.

With this definition of similarity, the nearest neighbors above a certain threshold are computed for each item. References to the nearest neighbors are stored with each item for later retrieval.

Clusters

The item similarity function defined above can also be used to induce a clustering over all items. Many clustering algorithms can be used here; a simple and efficient approach is hierarchical agglomerative clustering, for example with the single-linkage, or average linkage criterion. While the latter is computationally more expensive, it may yield more balanced cluster sizes and higher accuracy. An alternative way to compute the clusters is to use a technique like k-means clustering, which iteratively assigns data points to a cluster centroid and moves the centroids to better fit the data. One of ordinary skill in the art will recognize that other clustering methods may be employed.

A termination criterion determines when the clustering algorithm stops. One such criterion is a threshold on the similarity function defined above. In some embodiments, the clustering method computes many clusters at different similarity thresholds and stores indications of these clusters, which can later be used to aggregate performance metrics and enable the interactive user experience with a slider depicted in FIG. 2.

Figure 4:
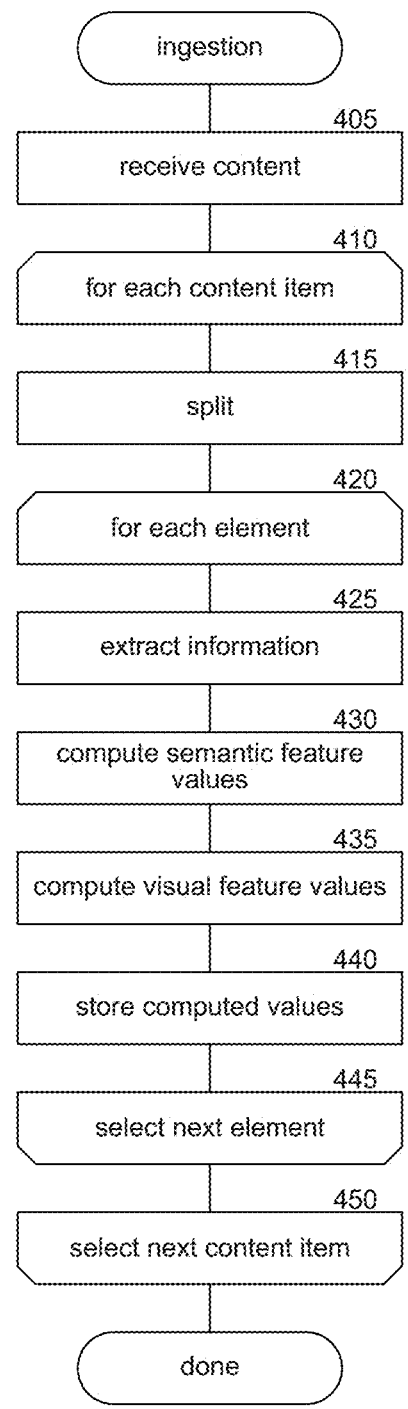
FIG. 4 is a flow diagram illustrating the processing of an ingestion component in accordance with some examples of the disclosed technology.

FIG. 4 is a flow diagram illustrating the processing of an ingestion component in accordance with some examples of the disclosed technology. In block 405, the component receives content, such as content submitted by users, content retrieved using links, Uniform Resource Locators, etc. In some cases, the component may retrieve a set of content items based on a received list of files or directories. In blocks 410-450, the component loops through each of the received content items to process each for ingestion into the system. In block 415, the component splits the current content item into "content elements," if the component is comprised of more than one content element, by, for example, identifying breaks or boundaries between each content element. For example, if the content item is a presentation deck, then the component can split the content item into slides. As another example, if the content item is a word processing document, then the component can split the content item into pages. In blocks 420-445, the component loops through each of the content elements for the currently selected content item to analyze and identify semantic and/or visual features of the content element. In block 425, the component extracts information from the content element, such as text, tokens, graphics, formatting, etc. In block 430, the component determines semantic feature values for the content element based on the extracted information. For example, the component may apply latent semantic analysis techniques to extracted text. In block 435, the component determines visual feature values for the content element based on the extracted information. For example, the component may generate a thumbnail of the content element, identify the most common color or colors or font used in the content element, and so on. In some cases, various features may be weighted differently. For example, larger text (bigger font) may be weighted more heavily than smaller text. As another example, text with a high contrast compared to the background may be weighted more heavily than text that is similar in color to the background (e.g., by comparing RGB, HSV, and/or intensity values of the pixels corresponding to text to the RGB, HSV, and/or intensity values adjacent pixels). In block 440, the component stores the computed values (in accordance with their weights). In block 445, the component selects the next content element of the currently selected content item and loops back to block 425, if there are any remaining; if not, the component continues at block 450. In block 450, the component selects the next content item and loops back to block 415, if there are any remaining; if not, the component completes. In some embodiments, a means for ingesting content comprises one or more computers or processors configured to carry out an algorithm disclosed in FIG. 4 and this paragraph.

Figure 5:
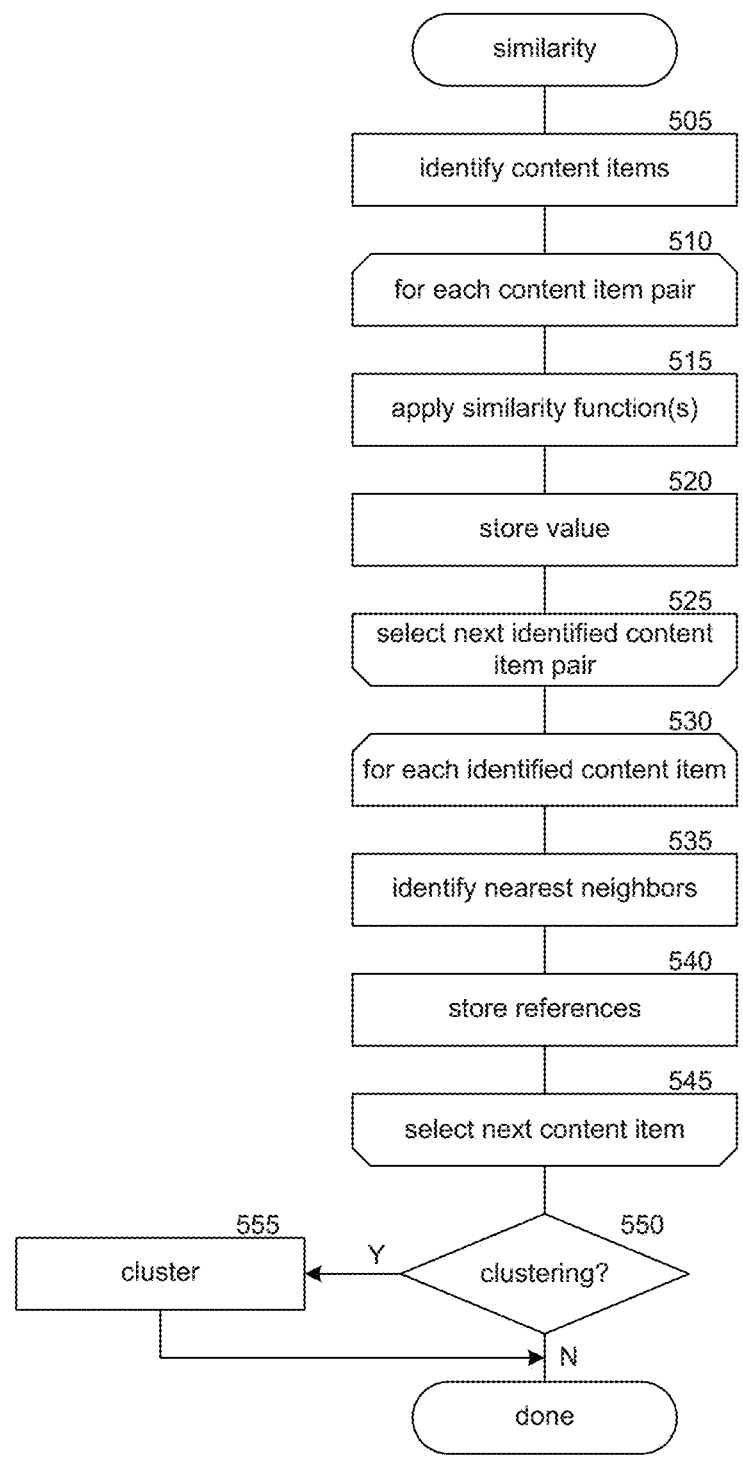
FIG. 5 is a flow diagram illustrating the processing of a similarity component in accordance with some examples of the disclosed technology.
Figure 6:
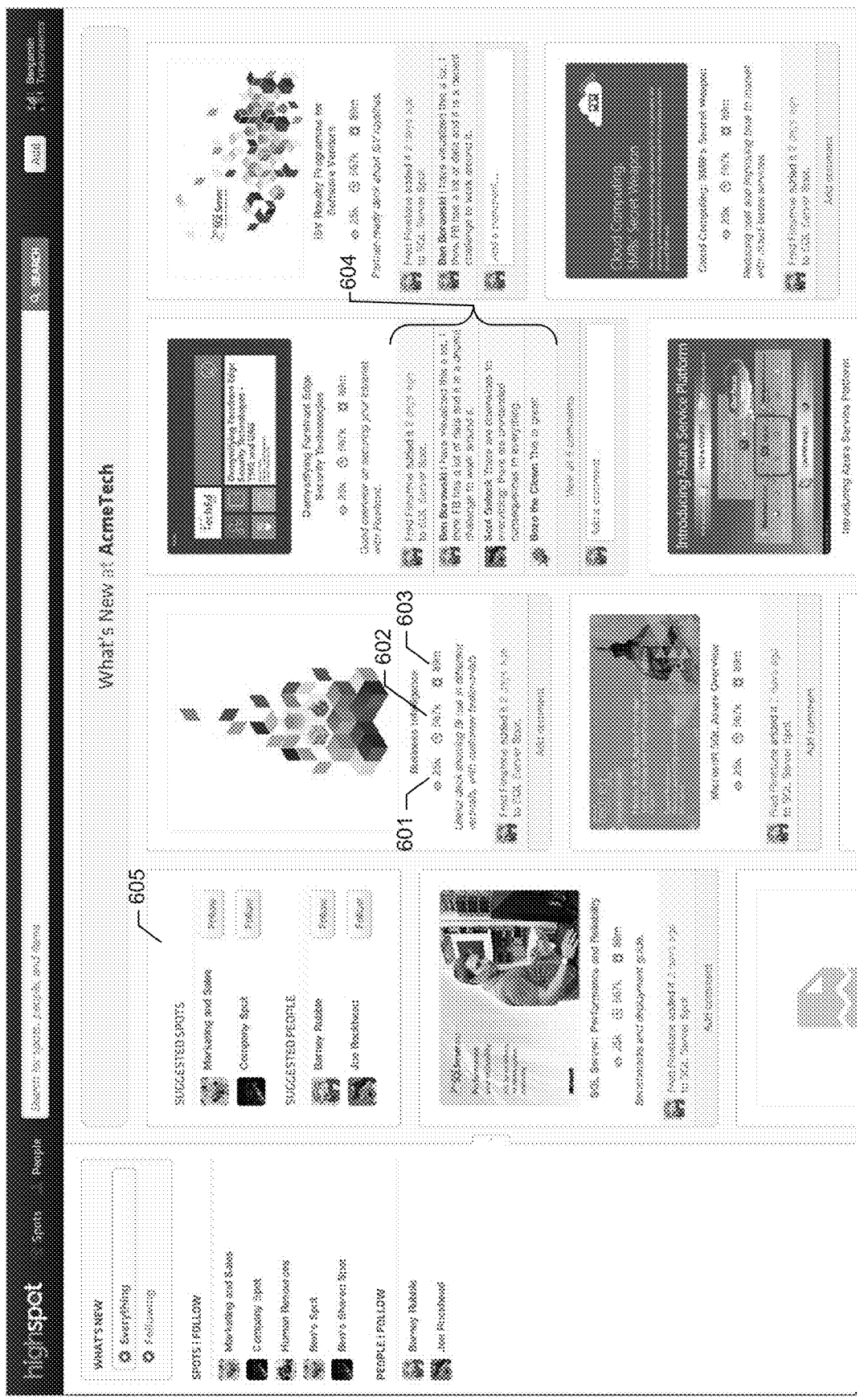
FIG. 6 is a display page illustrating a feed of business information for a user.

FIG. 5 is a flow diagram illustrating the processing of a similarity component in accordance with some examples of the disclosed technology. In block 505, the component identifies the content items for which similarity measures are to be generated. For example, the component may receive a list of content items or a directory or set of directories to process. In blocks 510-525, the component loops through each pair of identified content items to generate a similarity measure for the pair. In block 515, the component applies one or more similarity functions to the stored semantic and/or visual features determined for each content item to generate one or more similarity values. For example, the component may identify a feature found in both content items, such as a table or graph and compare features of both, such as text stored therein, colors, etc. In block 520, the component stores the similarity value(s) in association with each content item of the pair. For example, the component may store the values as metadata for each content item, in a separate database, lookup table, or other data structure, and so on. In block 525, the component selects the next content item pair and loops back to block 515, if there are any remaining; if not, the component continues at block 530. In blocks 530-545, the component loops through each of the identified content items to identify, for each, the most similar content items. In block 535, the component identifies the nearest neighbors (i.e., most similar content items) using the similarity values for the currently selected content item (each similarity value for the currently selected content item representing the similarity between the currently selected content item and a different content item (i.e., a content item pair)). For example, the component may identify a predetermined number of similar content items, such as the top 3, top 5, top 10, or top 50 most similar content items. As another example, the component may identify all content items for which a similarity value that exceeds a predetermined threshold (e.g., 0.1, 0.6. 0.8, 0.95) was calculated. In some cases, the component may apply a combination of these techniques. In block 540, the component stores references to the identified neighbors in association with the currently selected content item, such as in metadata of the currently selected item, in a database, lookup table, or other data structure, and so on. In block 545, the component selects the next content item and loops back to block 535, if there are any remaining; if not, the component continues at block 550. In decision block 550, if the component is configured to perform clustering, then the component invokes a clustering component at block 555 that applies one or more clustering algorithms to the identified content items, else the component completes. In some embodiments, a means for assessing similarity of content items comprises one or more computers or processors configured to carry out an algorithm disclosed in FIG. 5 and this paragraph.

Elaborations

To accurately compute semantic similarity, extracting all text contained in a slide is important, but not all text can be easily obtained. In some cases, text is contained in embedded images. In such cases, an optical character recognition (OCR) algorithm can be applied to extract the text.

One challenge is that the embedded images of a slide or page have different purposes. Some are diagrams with important content, some are company logos, and some are background themes, and so on. Without treating such embedded images separately, it is difficult to define features and boosts that only surface semantically related content. This problem can be addressed by determining the function of an embedded image using properties such as if the image is contained in the slide template.

In some embodiments, the system uses visual features on the slide renderings and embedded images, such as features based on colors or scale-invariant feature transform (SIFT). This approach increases recall, allowing the system to find more similarities between slides, but, when applied to slide renderings, may favor purely visual over semantic similarity.

One potential challenge is that slides tend to contain only small amounts of text. Two slides may thus be semantically very similar, and nonetheless share few features in common. To enable the system to discover such semantically similar slides or decks, one can apply a dimensionality reduction technique, such as latent semantic analysis (LSA). Each slide can then be represented with a smaller number of features (a few hundred or thousand). This reduced dimensionality also makes it possible to efficiently search for nearest neighbors, for example, using a KD-tree index.

To compute measurements such as usage, performance or customer engagement, and business impact (as shown in FIG. 3), data may need to be imported from other systems. In this example, the data may be stored in a marketing automation system, which is commonly used to send email to many actual and potential customers, measuring their level of interest and scoring how likely they will be to purchase the product. Data about the deals in which the content is involved may be stored in a sales automation system, also known as a customer relationship management (CRM) system. Other measures of content performance might come from a learning management system or other business application. The system may need to pull data from a variety of data sources in order to provide a complete picture of the performance of the content for its intended use within the organization.

Interest Graph Powered-Browsing and Information Feed

The technology described herein allows users to browse through collections of content, organized and sorted on their behalf by other users and by the system. The information includes documents and presentations, web sites and pages, audiovisual media streams, and the like. Each item is presented with social signal that represents the way that the community inside and outside the organization has been interacting with that information. For example, the system shows how frequently an item has been viewed. Within organizations, there are often restrictions as to what data is available to each person, so each user is allowed to see the items that they have access to. The disclosed system enforces these access rights.

The technology described below also creates an information feed that contains items like documents and presentations, web sites and pages, and audiovisual media streams. Each item is presented with user signal that represents the way that the community inside and outside the organization has been interacting with that information. For example, the feed shows how frequently an item has been viewed and what comments have been made about it. The feed also honors access rights—within organizations, there are often restrictions as to what data is available to each person, so the feed shows each user information that they have access to.

This disclosure describes the creation and use of an interest graph within a company, and between companies, to drive information browsing and the presentation of an information feed. An interest graph expresses the affinity between people and information—the likelihood that a particular piece of information is of interest to a particular person. The information might be a document, a presentation, a video, an image, a web page, a report, or the like. The information might also be a collection of items, or a link to a collection of items or to a person. The interest graph is based on an understanding of relationships, monitoring of user behavior, and analysis of each piece of information. The interest graph can represent many kinds of relationships, including: between users and other users, users and items, and users and collections. The interest graph can be computed using data both from the set of items and from user behavior. In some examples, there are three steps for computing the interest graph. The first step is to generate the data; the system provides mechanisms for the user to quickly browse, share, and organize items of information. By using those features, the users create a large amount of usage data, much of which is currently uncollected and unavailable to existing information management and retrieval software. The next step is to gather the data, where the system logs user activities in a set of data structures. The third step is to compute the interest graph. By running a series of computations over the information gathered from users, the system computes data structures that are used for a variety of ranking or search operations. The disclosed techniques honor access restrictions that users specify for each item, so that only authorized people will see any item of information.

Information Feed

One way that users discover useful and compelling content online is through discovery. Discovery is opportunistic—the system learns about that user and what they are interested in, and presents items based on that understanding. For example, the system can track the information that users have viewed in the past, and find items that are similar or that were viewed by other people who looked at the same or similar information as the current user. The information that the system identifies is presented to the user as a sequence of items, typically in exactly or approximately the order of the time that they were created or updated. This sequence is known as the feed.

Figure 11:
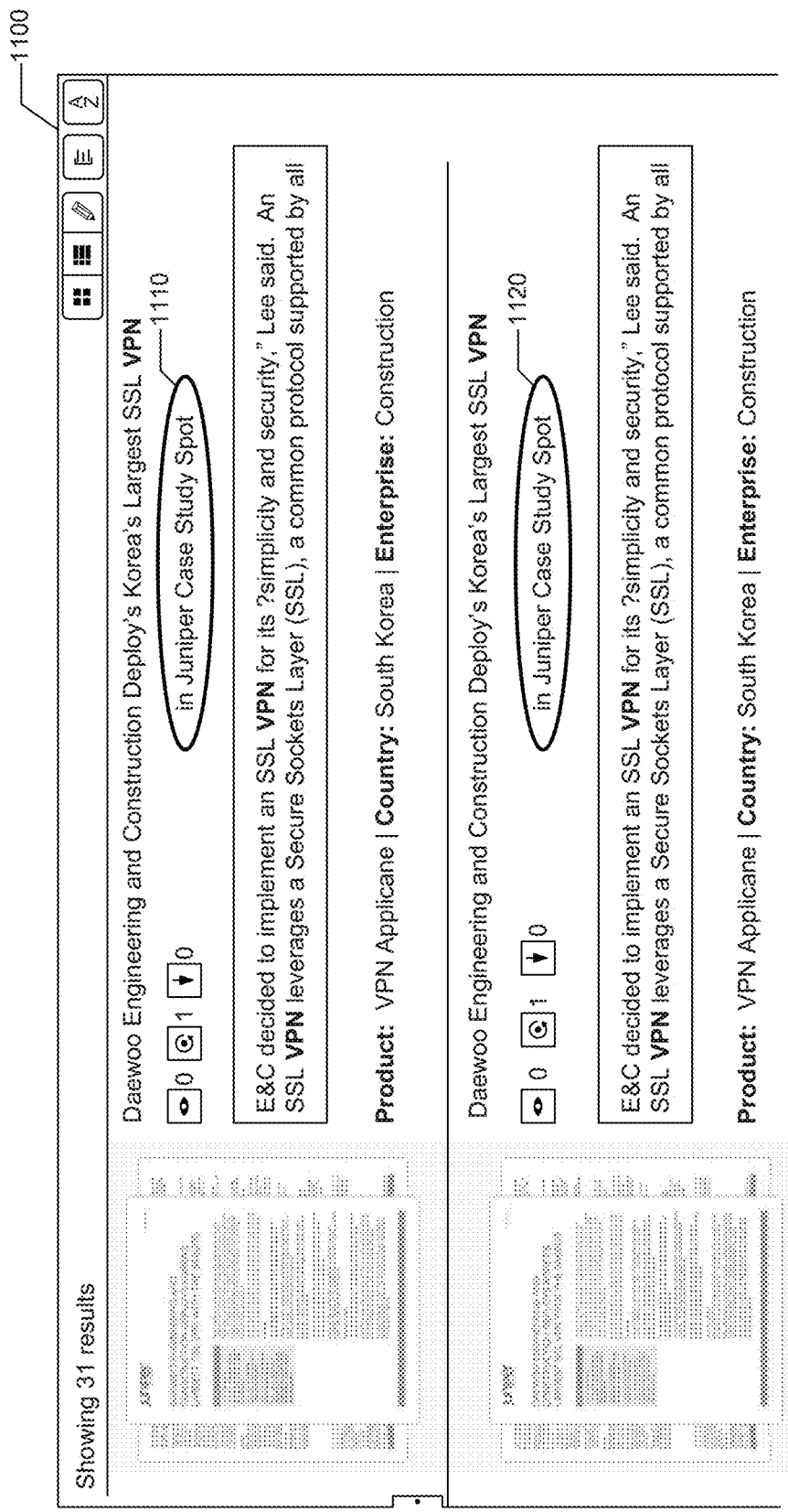
FIG. 11 is a display page illustrating the expansion of duplicated search results.

The disclosed system creates a feed of information, such as business information, based on the interests of the user, which are analyzed by assembling an interest graph. FIG. 11 shows the feed for a user. Note that the items in the feed are documents, presentations, images, Web pages, and other information that help employees do their work. Also note that associated with each item is a summary of user signal—the amount of activity the item has sparked within the community of users who have access to it. In FIG. 11, there are three numbers reported for each item—the number of views 601, the number of respots 1102, and the number of downloads 1103. A "respot" is a decision by one user to republish an item they find of interest into one of their own collections. Similarly, if users have commented on the item, a selection of those comments 1104 are also included in the feed. These user signals are shown in the feed to help users assess how useful the community has found the item to be. As is detailed below, in addition to the signal that is shown to other users, many other signals can be used to compute the interest graph.

In addition to the business content itself, the feed can also be used to recommend users whose activities may be of interest and collections of items that seem relevant. In FIG. 11, there is an entry in the feed containing such suggestions 1105.

The feed can be presented to users through a Web experience, as shown in FIG. 11, as an online or offline custom application experience on a PC or on a device (such as a phone or tablet), via push mechanisms like email or instant messaging, or in other social networks (such as Twitter, Yammer, Pinterest, or Facebook), and other outlets. A push notification can be triggered automatically when a sufficient number of relevant items are found, or at a user specified interval.

In some examples, the feed is implemented in the system as follows:
1. Determine which items are both accessible to the user and contain words or strings from the search library. This process may be performed using a software package, such as the Lucene software library supported by the Apache Software Foundation. As described below, Lucene computes and uses an index that reports, for every lexeme in the search query, the items that contain that lexeme. This reported set of items is the candidate set of items.
2. Compute a textual rank for each candidate item (i.e., an item in the candidate set) based on a similarity algorithm. This rank is based on the textual contents of the items and on the search phrase.
3. Run a computation (i.e., a subroutine) called Item-Ranker (described below) on the candidate set to assign an overall rank to each item. The computation relies on the interest graph and the textual rank to compute a rank for each item indicating how interesting it is expected to be to the current user (i.e., the user for whom the feed is generated).
   Note that the activity counts used by ItemRanker, which are stored in the ItemScore data structure, can be multiplied by a fractional value each day. This has the effect of causing older actions to be weighted less than more recent ones (producing an exponential effect based on the age in days of the activity). The fractional value determines how quickly the usefulness of older activity attenuates. There are many other algorithms that could be used to calculate the recency of an item, including (but not limited to) using a fixed or adjusted linear scale factor based on the age of the activity, discarding data that is older than a certain window of time, or attenuating the data for a period of time and treating all older activity as equal in weight and hence in importance. Also note that it is possible to use different age algorithms for different computations. For example, the system offers an alternative sort order for items on a spot that biases more for recent activity, by attenuating the weight of older activity more aggressively than it normally does. It is also possible to use different weights in the ranking algorithm for different computations or sort orders.
4. Present the resulting items to the user, sorted, for example, in overall relevance rank order (highest value first).

Result Deduplication

It is very common for the same item to appear many times across the internal networks of an organization. If that item is of strong interest to the user, it could easily appear many times in the feed, "polluting" the feed. To prevent feed pollution, the system identifies when two items are identical (even if they have been separately copied into different collections of information and/or given different filenames) and will only present such items once in the feed.

In some examples, the system implements de-duplication as follows:
   As the contents of items are indexed, a hash code is computed for each item based on its contents (see below for details). This hash code is, with high probability, unique across all the items. When two items have matching hash codes, they are noted in the inverted index as having identical contents.
   As the items are ranked for presentation in the feed using the interest graph, identical items are combined (grouped), though their individual ranks are recorded. When the ranked search results are presented, the system presents the single item with the highest rank.
   If the user requests it, the system expands the collapsed items to show duplicated matches, still ranked in order of likelihood to interest the user based on the interest graph.

Other Potential Uses

There are a number of other ways that the feed can be used and the interest graph powering it can be enhanced in various embodiments of the disclosed technology.
   Augment the interest graph computation with real-time feedback. Regularly adjust the algorithms used to compute the interest graph and the weightings based on the effect on user behavior. For example, divide the user community into groups (sometimes called cohorts), present the results of different weights or algorithms to the different groups, and adjust the system based on the most successful approach.
   Track more granular user behavior. Follow the mouse movements of a user to get additional information about their interests.
   Voting and reputation. By providing ways for users to vote on the contributions of others, the voting patterns resemble commenting patterns, and can be added into the data structures that track interactions between users and measure the influence of a user on others in the community. For example, if one user votes for the contribution of another, the system can treat that the same way as making a comment. Each such vote represents an additional amount of influence that can be added to other indications, such as the number of followers they have or the number of times others commented on an item that a user uploaded.
   Rank subsets of an item. Based on the sections of video that other users have watched or otherwise interacted with, and the affinity of the current user to the other users, the system can identify and present the sections within the video most likely to be of interest. Similarly with other media types, like audio, or with components of structured documents, like a CAD diagram, the system can identify a section or sections thereof most likely to be of interest to a particular user. Similarly, the system might rank the pages of a document or the slides in a presentation in terms of which are most likely to interest the user based on the extent to which users have viewed or interacted with portions thereof. These ranks could be used to create a digest (summary) of the item that is faster for users to review, such as a "highlights" synopsis of a video, or a summary document.
   Present derived information. In addition to indexing the contents of an item, the system can apply a variety of computations that derive new information based on the content, and apply the interest graph to searching that derived data. For example, the system can perform voice recognition of an audio or video stream and search the text that it has computed via the voice recognition. The system may perform a dependency analysis on a CAD diagram and include dependent components in the feed, even though they are not present in the original diagram. Each of the derived items may be treated as a separate content item for ranking and affinity calculation purposes. The system may perform image recognition and search for the names or characteristics of objects and people that have been recognized.

Incorporate additional sources of social graph information. Patterns of email for each user provide an indication of the topics that they are interested in and the people with whom they interact most frequently. The interest graph could be enhanced by performing content and traffic analysis on email and on aliases that have been set up by users to communicate with each other. Another example is the user directory. Many organizations maintain directories that maintain the membership of users in groups and the relationship between groups. A common example is Active Directory. Such directories are used to enforce access permissions, set up email aliases, and a variety of other purposes. There are also HR and payroll systems that capture relationships among users as well. Another source of information is on-premise server systems. For example, by looking at the permission sets for file systems and the access patterns, additional social information would be available that is similar to what the system tracks internally. Another potential source is public social networks outside of the organization (such as Facebook, Twitter, Instagram, and the like). All of these systems have information about the social graph that could be incorporated into the interest graph. For example, if one user "follows" another person in the company on Twitter, that can be treated similarly to following somebody within the system and incorporated into the interest graph. Likewise when two people are "friends" on Facebook, or otherwise connected on a social networking site, this connection can be included in the interest graph. As another example, comments by one person on an item posted by another, which is similar to commenting on an item published within the system, can be incorporated into the interest graph.

Use role/title information. If users are assigned roles or titles, either by self-selection or by the company, those with similar roles and titles are likely to have some interests in common—another signal that can be incorporated into the interest graph.

Identify similar items as well as true duplicates. Often items are related but not identical. For example, a slide deck that contains some of the same slides as another, but reordered or intermixed with others. Or, a document that has been modified, but much of the substance is the same. Similarity could be used to do more aggressive deduplication, or to identify when content is related, or to identify when users have similar interests because they interact with similar documents as well as identical ones. Another option is to offer users the ability to construct new content from pieces of existing ones. For example, assembling a presentation from slides that come from multiple existing decks. This would reveal the relationships between the assembled and original decks, and would give additional signal on which slides of a presentation are the most valuable.

Additional types of content analysis. There are a variety of ways to analyze content to reveal information that would be useful for the interest graph. For example, performing facial and feature recognition of images. The analysis could be used to find items that are about related topics. Facial recognition could be used to compare content images to user profile pictures, to identify content that is about people in the system. The system could automatically perform language translation on items of particular interest. Or it could create higher resolution previews, or graphical rendering/visualization of data, or create 3D images. The system could automatically perform language translation on items of particular interest or create higher resolution previews, graphical rendering/visualization of data, or 3D images using known techniques.

Proactively get ready to deliver items likely to be of interest. Items likely to be of interest to a user can be downloaded to a device for optimized or offline access, or pre-cached in a content delivery network (CDN) for faster delivery to the browser. A group of items might be presented to the user together for faster viewing.

Target advertisements and promotional offers. The system may target offers to users based on their activities and interests (e.g., the items they are currently browsing). These might be sponsored by the organization they work for, by a partner, or by outside companies. For example, a company might allow vendors to compete for or purchase the right to market services to employees. Similarly, there might be a facility for "sponsoring" particular items and ranking sponsored items higher, highlighting sponsored items visually, indicating the nature of the sponsorship, and so on. Such sponsorship might be done manually, by an algorithm, by a business rule, by an expert system.

Instant search. The system can present search results incrementally as the user is typing, rather than waiting for them to specify a full query.

Semantic search. Search queries can be semantically analyzed using techniques like latent semantic analysis and a variety of natural language processing algorithms that perform operations, such as relationship extraction, named entity recognition, and the like. Then, the system can do specialized operations appropriate for a particular domain or a particular semantic concept. For example, if the system determined that a search applied to a set of legal cases, it might automatically detect references to legal precedents and search through them as well as through the case itself. In manufacturing, the system could identify that a number was a reference to a part and extend its search to include the supporting information for that particular part.

II. Search/Discovery

Searching

Figure 8:
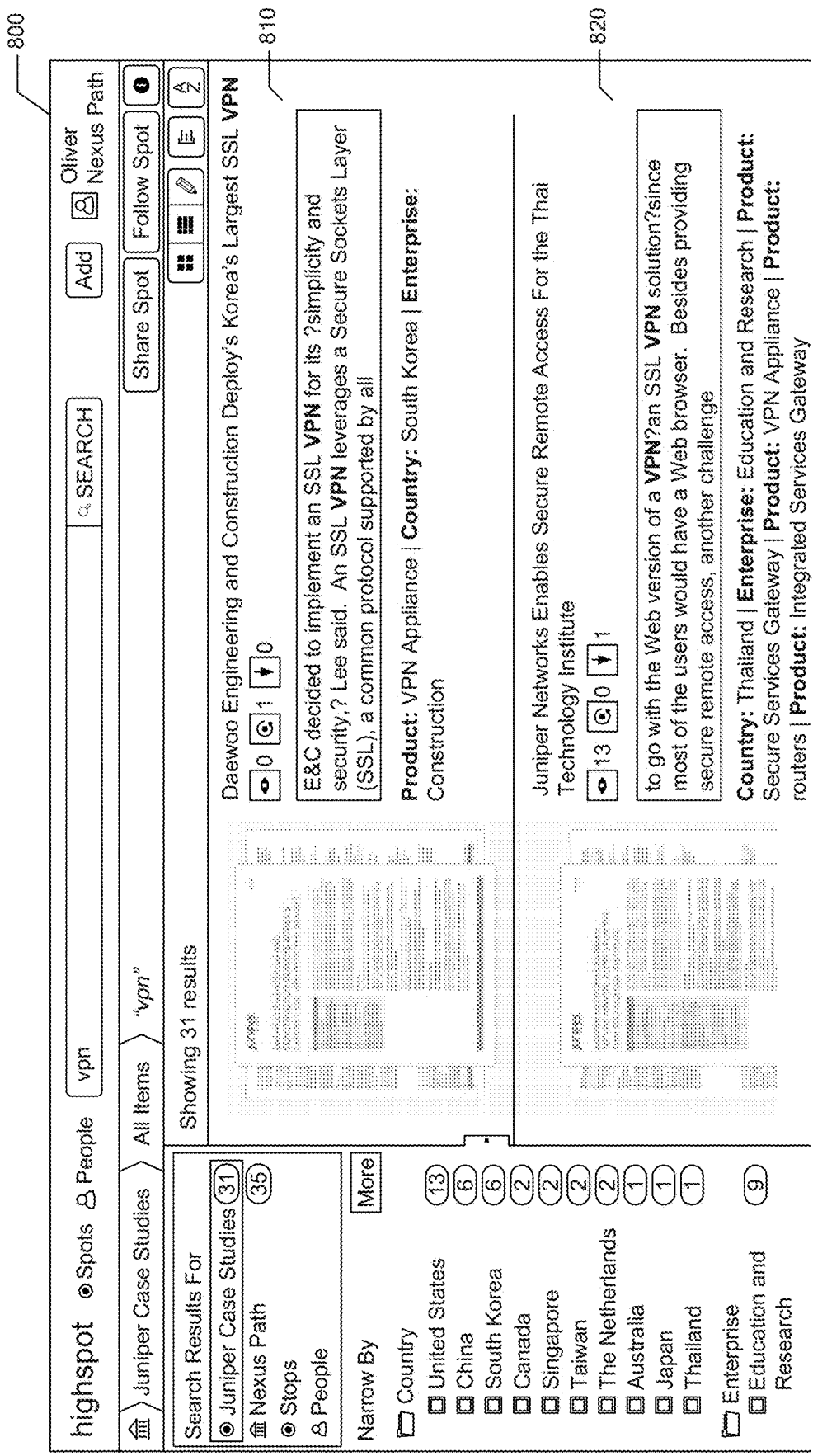
FIG. 8 is a display page illustrating a query and results page.

One of the most common ways that users look for information online is to type a query into a search box. The system uses the query to identify a candidate set of items, collections, and people that match it, attempt to rank order those candidates based on what is most likely to satisfy that user's request, and present the results. The system uses the interest graph to support search across items within a particular company and between multiple companies. FIG. 8 is a display page 800 illustrating a query and results page in accordance with some embodiments of the disclosed technology. In this example, a search and the set of results that have been returned by the system are displayed. In this example, a user has performed a search for "vpn" and the system has identified 31 results, including "Daewoo Engineering and Construction Deploy's Korea's Largest SSL VPN" 810 and "Juniper Networks Enables Secure Remote Access For the Thai Technology Institute" 820. The results are ranked based on how likely they are to interest the user, as explained below. For each result, the system highlights the elements of the search phrase that matched text associated with the item.

Basic Search

In a basic search, the user provides a string, and the system identifies items that the user has access to and that match the string. The items may include information which has been created by another user within the same organization (which will be referred to as an internal item) or by a user from elsewhere (an external item). The system allows items to be shared within and across organizations, and for their access to be restricted to particular sets of people.

In some examples, basic search is implemented in the system as follows:
  Determine which items are both accessible to the user and contain words or strings from the search query. This process may be performed using a software package, such as the Lucene software library supported by the Apache Software Foundation. As described below, Lucene computes and uses an inverted index that reports, for every lexeme in the search query, the items that contain that lexeme. This reported set of items is the candidate set of items.
  Compute a textual rank for each candidate item (i.e., an item in the candidate set) based on a similarity algorithm. This rank is based on the textual contents of the items and on the search phrase.
  Run a computation (i.e., a subroutine) called ItemRanker (described below) on the candidate set to assign an overall rank to each item. The computation relies on the interest graph and the textual rank to compute the overall rank.
  Present the resulting items to the user, sorted in overall rank order (highest value first).

Search Completion

Figure 9A:
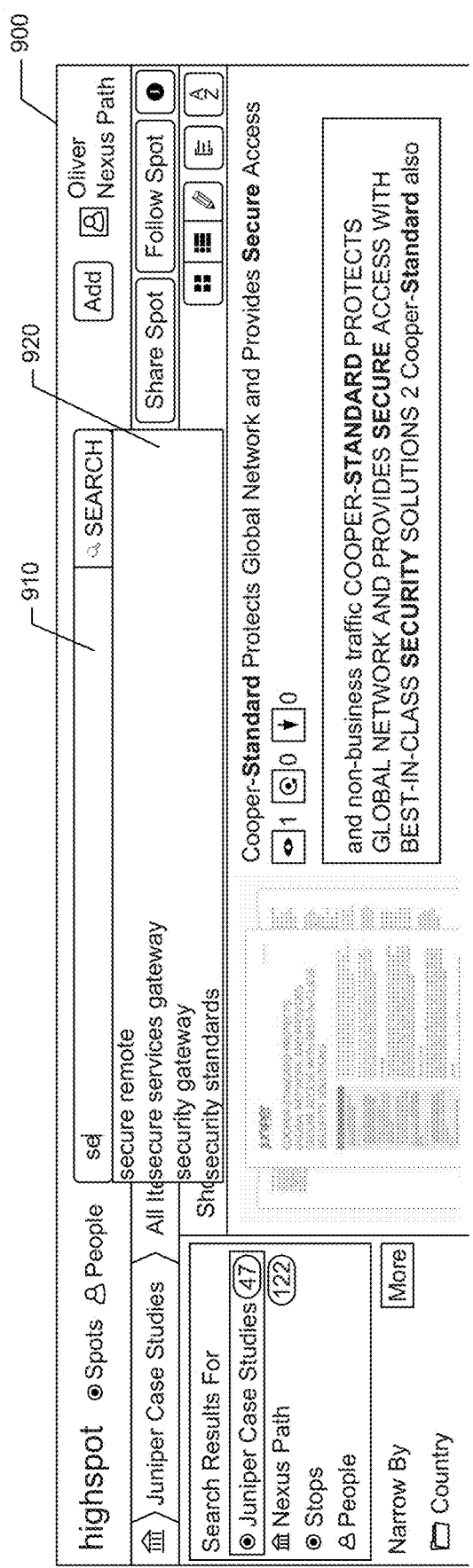
FIG. 9A is a display page illustrating a search completion feature.

Search completion is a feature that shows possible search queries while the user is typing in the search box (see FIG. 9A for an example). FIG. 9A is a display page 900 illustrating a search completion feature in accordance with some embodiments of the disclosed technology. In this example, a user has typed "se" in the search box 910 and the system has shown "secure remote," "secure services gateway," "security gateway," and "security standards" as possible search queries 920. Search completion is a very useful shortcut for users, showing them search queries that are likely to be relevant and that have a good probability of yielding useful results.

In some examples, search completion is implemented in the system as follows:
  As the user types, the system passes the partial search query to a computation called CompletionRanker (described below). CompletionRanker returns a ranked set of search completions that are most likely to be of interest to the user, based on the behavior of other users in the system and on the information in the interest graph.
  Present the ranked set of completions to the user in a dropdown.

Search Completion with Counts and Groupings

Figure 9B:
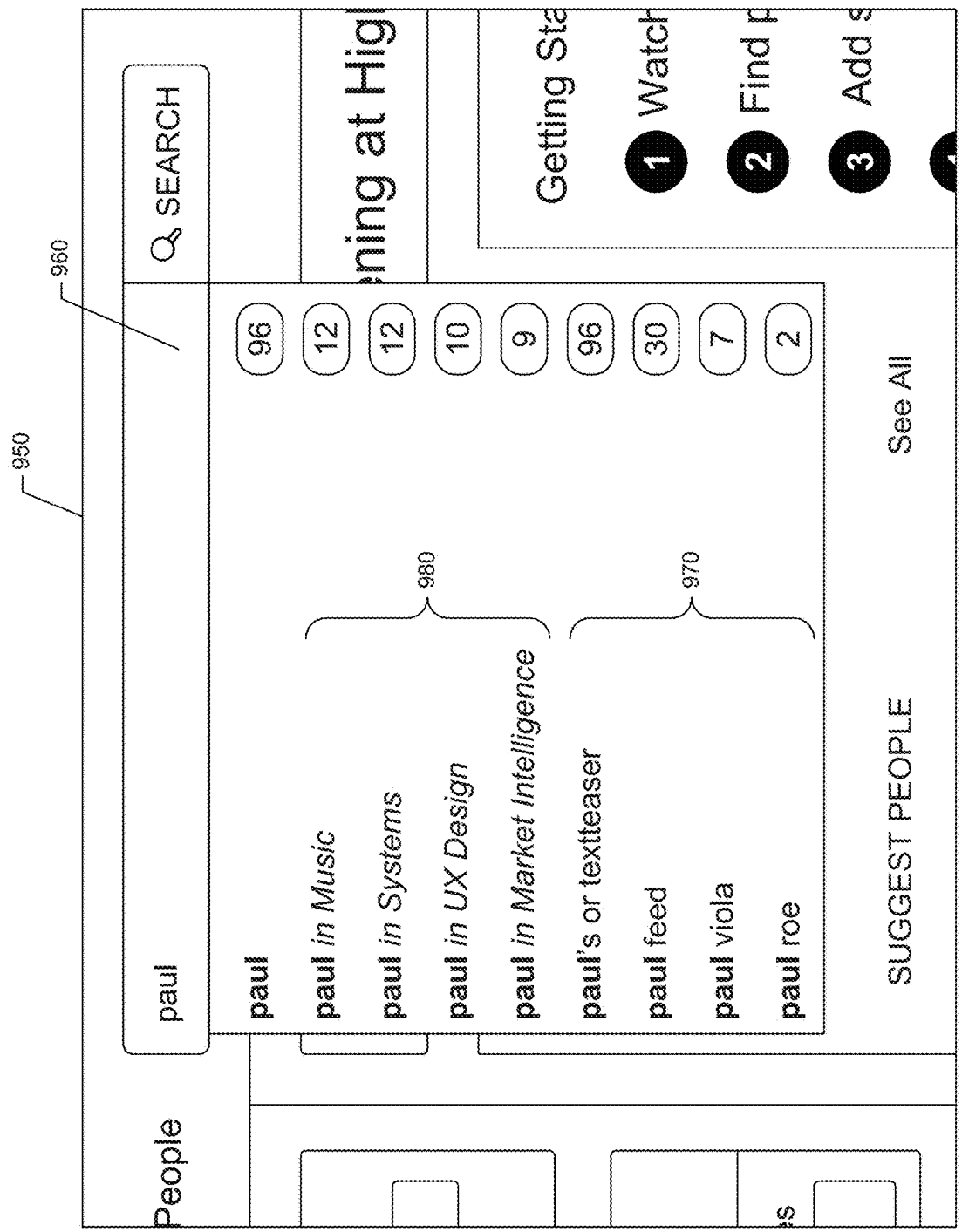
FIG. 9B is a display page illustrating a search completion and number of results feature.

Additionally the set of the completions can include information about the number of results that would be returned by each query. This information can help the user to formulate a query that will return a satisfactory number of results. Additionally some of the completions can include a speculative scoping of the search to a user specified collection, such as a spot. For example for the query {vision}, one suggestion could be {vision in the Benefits Spot (5 docs)}. Selecting this suggestion will return the 5 documents that are contained in this spot. Similarly the scope can a single user or group of users. For example {sql} could yield {sql by Robert Wahbe (20 docs)}. Selecting this would show the 20 docs uploaded by Robert that contain the term sql. FIG. 9B is a display page 950 illustrating a search completion and "number of results" feature in accordance with some embodiments of the disclosed technology. In this example, a user has typed "paul" into search box 960 and the system has shown "paul's or textteaser," "paul feed," "paul viola," and "paul roe" as possible search queries and their corresponding number of results (i.e., 96, 30, 7, and 2) 970. The system has also shown the number of results of "paul" in various collections, such as "Music" {12}, "Systems" {12}, "UX Design" {10}, and "Market Intelligence" {9} 980.

De-Duplicate Search Results

Figure 10:
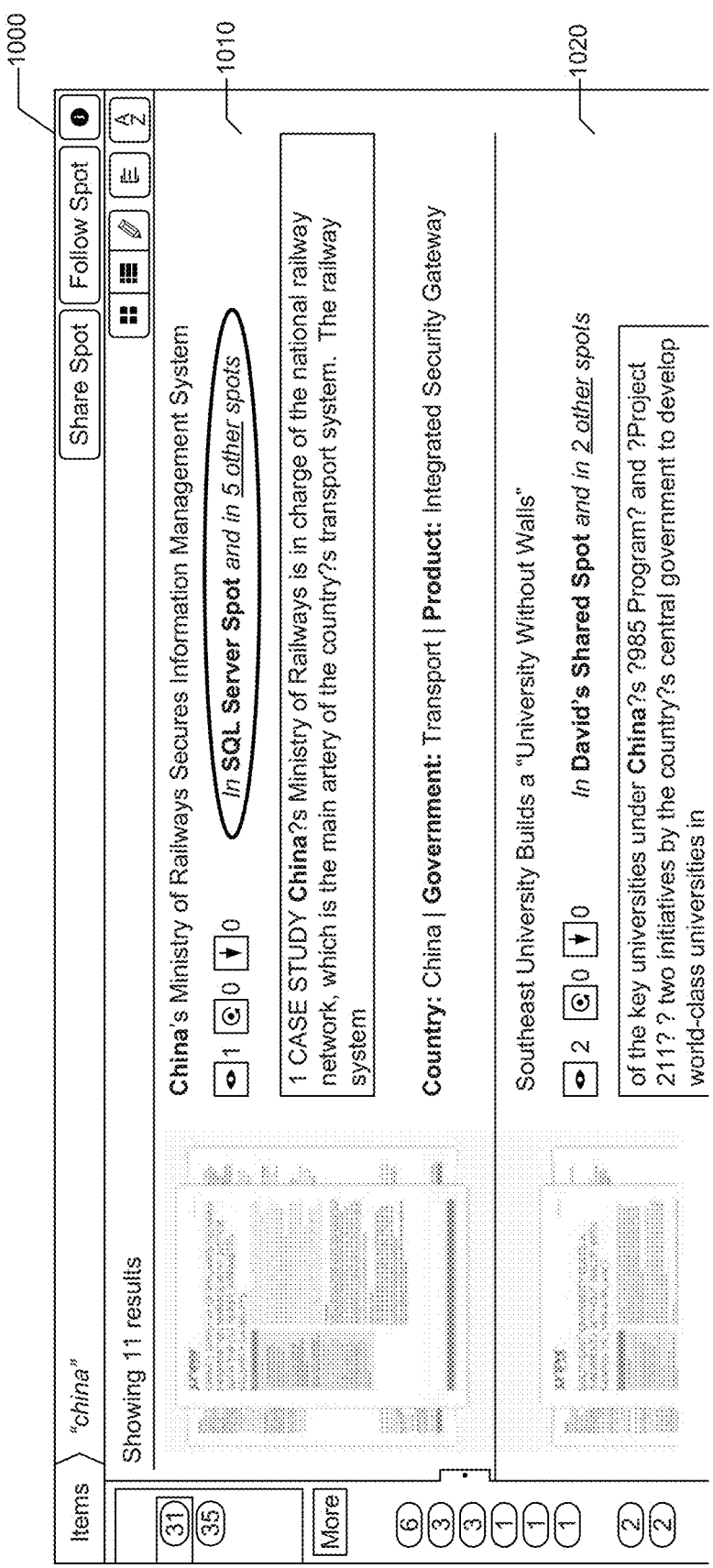
FIG. 10 is a display page illustrating de-duplication of identified search results.

For business information, it is common that the same item appear many times in many different collections of items. For example, a particularly useful presentation might be placed in an official repository, downloaded and emailed to many people, and then posted to a variety of different collections. The system identifies cases where an item has been duplicated, combines those into a single item in the results presented to the user, and uses the interest graph to choose the one most likely to interest that user. FIG. 10 is a display page 1000 illustrating de-duplication of identified search results in accordance with some embodiments of the disclosed technology. FIG. 10 shows a search that has found at least two duplicated items ("China's Ministry of Railways Secures Information Management System" 1010 and "Southeast University Builds a 'University Without Walls'" 1020) and combined each set of duplicated items into a single instance.

FIG. 11 is a display page 1100 illustrating the expansion of duplicated search results in accordance with some embodiments of the disclosed technology. FIG. 11 shows how a single item ("Daewoo Engineering and Construction Deploy's Korea's Largest SSL VPN") can be expanded to show the copies and, for example, each copy's location 1110 and 1120.

In some examples, the system implements de-duplication as follows:
  As the contents of items are indexed, a hash code is computed for each item based on its contents (see below for details). This hash code is, with high probability, unique across all the items. When two items have matching hash codes, they are noted in the inverted index as having identical contents.
  As the items are ranked using the interest graph, identical items are combined (grouped), though their individual ranks are recorded. When the ranked search results are presented, the system presents the single item with the highest rank (as shown in FIG. 10).
  If the user requests it, the system expands the collapsed items to show duplicated matches, still ranked in order of likelihood to interest the user based on the interest graph.

Other Potential Uses

There are a number of other ways that the interest graph can power improved search behavior:

Rank subsets of an item. Based on the sections of video that other users have watched, and the affinity of the current user to the other users, the system can identify the sections within the video most likely to be of interest. Similarly with other media types, like audio, or with components of structured documents, like a CAD diagram, the system can identify a section or sections thereof most likely to be of interest to a particular user. Similarly, the system might rank the pages of a document or the slides in a presentation in terms of which are most likely to interest the user based on the extent to which users have viewed portions thereof.

Search for derived information. In addition to indexing the contents of an item, the system can apply a variety of computations that derive new information based on the content, and apply the interest graph to searching that derived data. For example, the system can perform voice recognition of an audio or video stream and search the text that it has computed via the voice recognition. The system may perform a dependency analysis on a CAD diagram and include dependent components in the search operation, even though they are not present in the original diagram. The system may perform image recognition and search for the names or characteristics of objects and people that have been recognized.

Instant search. The system can present search results incrementally as the user is typing, rather than waiting for them to specify a full query.

Semantic search. Search queries can be semantically analyzed using techniques like latent semantic analysis and a variety of natural language processing algorithms that perform operations, such as relationship extraction, named entity recognition, and the like. Then, the system can do specialized operations appropriate for a particular domain or a particular semantic concept. For example, if the system determined that a search applied to a set of legal cases, it might automatically detect references to legal precedents and search through them as well as through the case itself. In manufacturing, the system could identify that a number was a reference to a part and extend its search to include the supporting information for that particular part.

III. Browse

This disclosure describes the creation and use of an interest graph within a company, and between companies, to drive information browsing. An interest graph expresses the affinity between people and information—the likelihood that a particular piece of information is of interest to a particular person. The information might be a document, a presentation, a video, an image, a web page, a report, or the like. The information might also be a collection of items, or a link to a collection of items or to a person. The interest graph is based on an understanding of relationships, monitoring of user behavior, and analysis of each piece of information. The interest graph can represent many kinds of relationships, including: between users and other users, users and items, and users and collections. The interest graph can be computed using data both from the set of items and from user behavior. In some examples, there are three steps for computing the interest graph. The first step is to generate the data; the system provides mechanisms for the user to quickly browse, share, and organize items of information. By using those features, the users create a large amount of usage data, much of which is currently uncollected and unavailable to existing information management and retrieval software. The next step is to gather the data, where the system logs user activities in a set of data structures. The third step is to compute the interest graph. By running a series of computations over the information gathered from users, the system computes data structures that are used for a variety of ranking or search operations. The disclosed techniques honor access restrictions that users specify for each item, so that only authorized people will see any item of information.

Browsing

Figure 12:
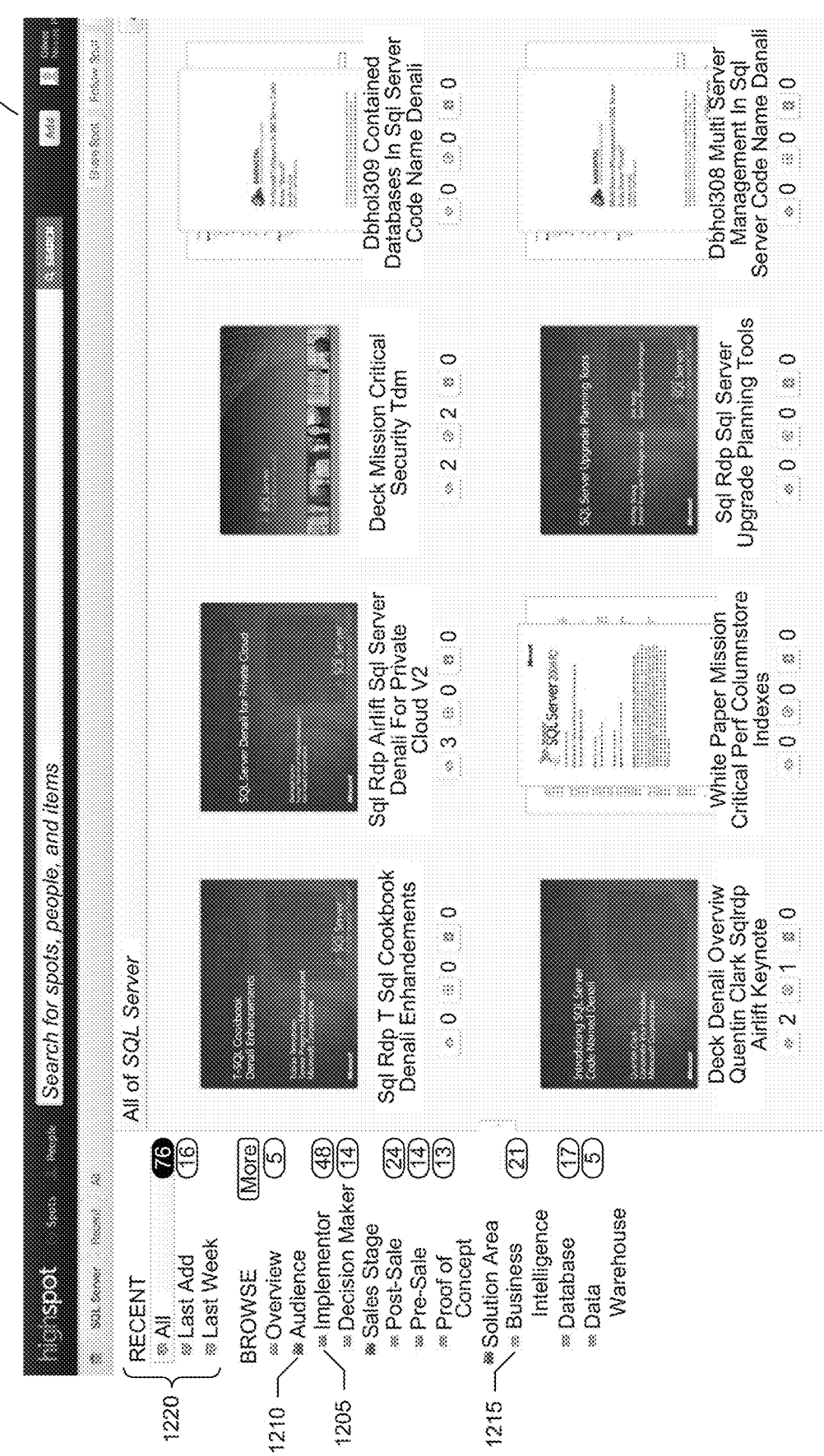
FIG. 12 is a display page illustrating a collection of information called a "spot."
Figure 13:
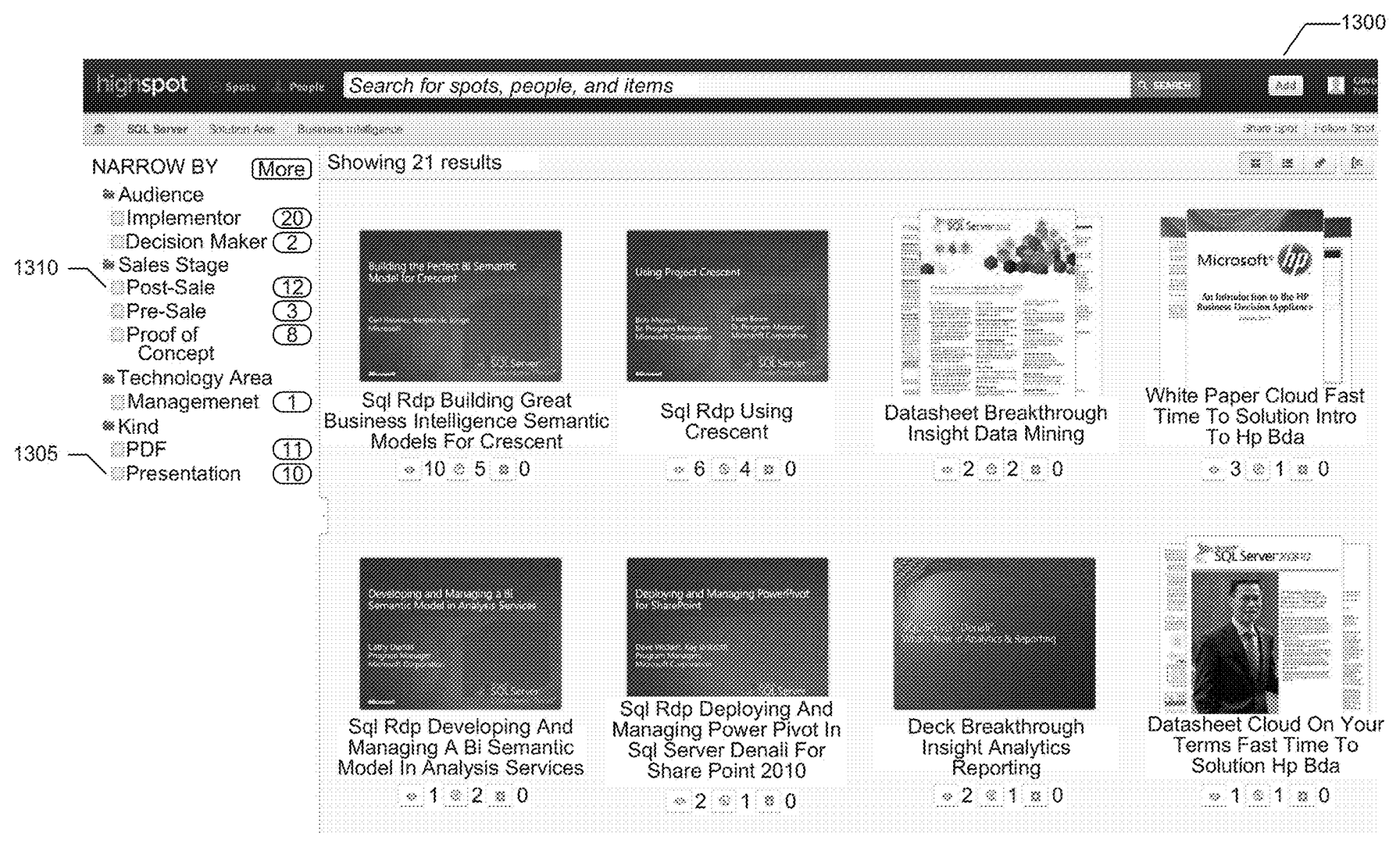

One way that users find useful and compelling content online is to browse through collections of content. In some examples of the disclosed system, the collections are called spots, which can be further organized by placing items of content into spotlists, or lists of items. A content item can be placed into any number of spotlists. Spotlists can also be gathered into folders. A user can browse content in many ways, including but limited to: viewing a directory of spots, finding a link to the collection on another spot, having the system suggest a collection, searching, having a link shared with them by another user, and so on. Users can, for example, look at the spot as a whole or look at a sub-collection of the spot by choosing a spotlist or a folder. FIG. 12 shows a spot home page 1200, which is the default view in the system when a user visits a spot in some embodiments. On the left, under the word "Browse", a set of spotlists and folders are presented. For example, the spotlist "Implementor" 1205 is a spotlist with 48 items in it and is in a folder called "Audience" 1210. If the user clicks on a spotlist (e.g., "Implementor," "Decision Maker," "Proof of Concept"), the system displays the items in that list. FIG. 13 shows the result of clicking on the spotlist called "Business Intelligence" 1215.

One of the ways the system helps users refine a particular group of results is with a technique called narrow-by. When a particular set of items is being presented, the system computes every spotlist that any item in the set belongs to. For example, an item might belong to a spotlist that relates to its target audience (such as "Implementor" and "Decision Maker" in FIG. 12). The item might also belong to a spotlist related to a topic it covers (such as "Business Intelligence"), or a region of the world that it is relevant for, or the like. If a spotlist contains only a subset of the items, it can be offered as a checkbox item that can be used to restrict the set of results.

FIG. 13 is a display page 1300 illustrating a sub-collection of information called a "spotlist" in some embodiments. In this example, there are 21 items in the "Business Intelligence" spotlist, but only 10 of them are presentations. In some cases, a spotlist, such as the "Presentation" spotlist 1305, is a smart spotlist, meaning that its contents are automatically computed by the system rather than specified by the user. Other spotlists, such as the "Post-sale" spotlist 1310, are user spotlists, where items are assigned to different spotlists by a user. In this example, 12 of the 21 business intelligence items are also in the post-sale spotlist. The user can ask the system to narrow down the results based on one of these other spotlists by clicking the checkbox next to the spotlist name.

Figure 14:
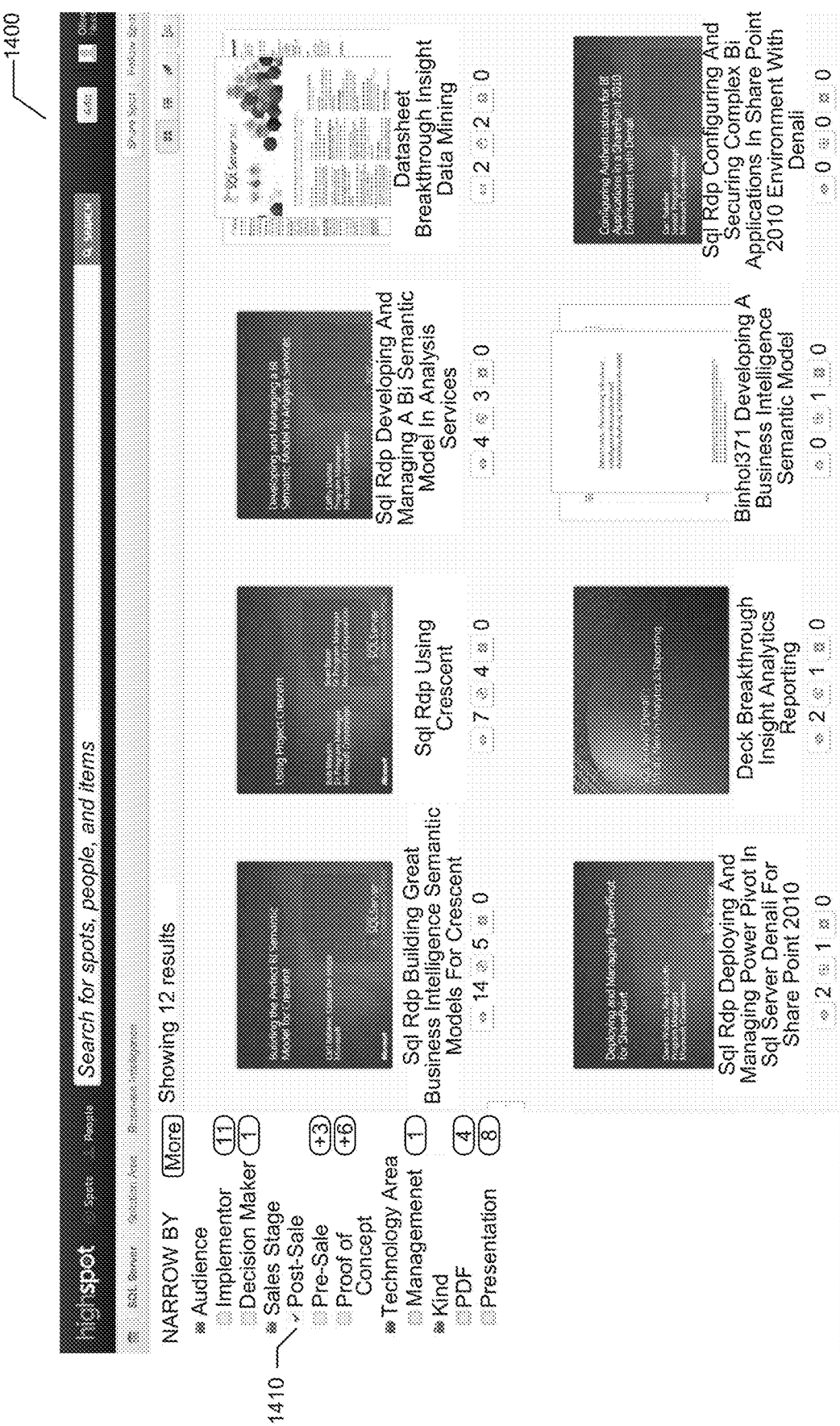
FIG. 14 is a display page illustrating a group of results filtered down via "narrow-by."

FIG. 14 is a display page 1400 illustrating a group of results filtered down via "narrow-by." In this example, the user has selected the "post-sale" checkbox 1410—the result set is reduced to only twelve items. The user can further constrain the results by clicking other checkboxes, or return to the full set by unchecking "post-sale."

At any given time, there is a current set of results, and these are by default presented to the user in relevance order. That order is computed by the interest graph, as described below, can be customized for each user, and is ordered based on what the system knows about that user's interests.

In some examples, the browsing experience is presented to users through a Web experience, as shown in FIGS. 12-15. One of ordinary skill in the art will recognize that the browsing experience can also be presented as an online or offline custom application experience on a PC or on a device (such as a phone or tablet).

In some examples, the ranking of items during browsing is implemented in the system as follows:
1. Determine the set of items in the current result set. This may be based on the user choosing to look at a collection of items (in the system, this is done by visiting a particular spot), or a subset (by clicking on a spotlist or folder), or performing a search operation. In the example shown in FIG. 12, the user can also use the selector 1220 in the upper left to see all the items, only the ones that were last added, or all the ones added during the past week.
2. Run a computation (i.e., a subroutine) called Item-Ranker (described below) on the result set to assign an overall rank to each item. The computation uses the interest graph to compute a rank for each item indicating how interesting it is expected to be to the current user (i.e., the user for whom the items are being ranked).
   Note that the activity counts used by ItemRanker, which are stored in the ItemScore data structure, can be multiplied by a fractional value each day. This has the effect of causing older actions to be weighted less than more recent ones (producing exponential decay based on the age in days of the activity). The fractional value determines how quickly the usefulness of older activity attenuates. There are many other algorithms that could be used to calculate the recency of an item, including (but not limited to) using a fixed or adjustable linear scale factor based on the age of the activity, discarding data that is older than a certain window of time, or attenuating the data for a fixed period of time and treating all older activity as equal in weight and hence in importance. Also note that it is possible to use different age algorithms for different computations. For example, the system offers an alternative sort order for items on a spot that biases more for recent activity, by attenuating the weight of older activity more aggressively than it normally does. It is also possible to use different weights in the ranking algorithm for different computations or sort orders.
3. Present the resulting items to the user, sorted, for example, in overall relevance rank order (highest value first).

In some examples, the suggestion of a collection of items that might interest the user is implemented in the system as follows:
1. Determine the set of collections that the user has access to. In the system, the permissions can be stored in a database, indexed by both collection and user.
2. Run a computation (i.e., a subroutine) called CollectionRanker (described below) on the result set to assign an overall rank to each item. The computation uses the interest graph to compute a rank for each collection indicating how interesting the collection is expected to be to the current user (i.e., the user for whom the suggested collection of items is generated).
3. Present the collections having an interest value above a threshold, sorted, for example, in overall relevance rank order (highest value first). The threshold is a value that represents a trade-off between precision against recall that may be established by the system, a user of the system, or an administrator of the system. Recall is the likelihood that the system will find something you are interested in, and precision is how well the system weeds out the things that you do not wish to see. A higher threshold improves precision (shows fewer items, that are more likely to be useful) and a lower threshold improves recall (shows more items, and hence is more likely to include a particular one of interest).

Related Items

Figure 15:
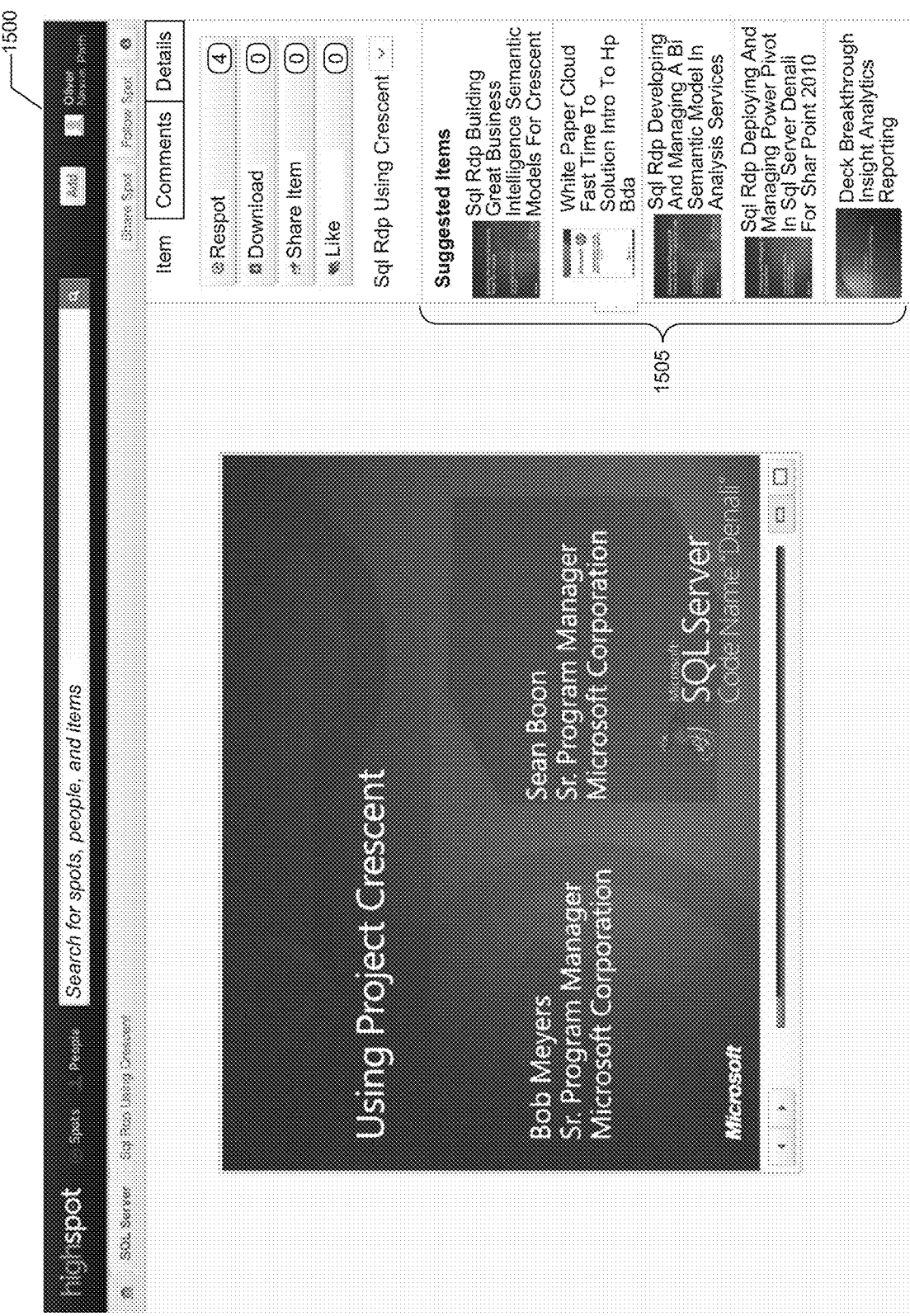
FIG. 15 is a display page illustrating an item with a list of related items.

While browsing for items, users often find an item about a topic of interest and use that item as a "seed" and let the system identify and suggest related items for further exploration. The system supports an interest-graph based model for finding information; whenever the user looks at an item, the system can suggest related items based on the interest graph. The items presented are customized for each user, based on what the system knows about the items and the user. FIG. 15 is a display page 1500 illustrating an item with a list of related items and the suggestions 1505 appear in the lower right hand part of the screen.

In some examples, the system identifies related items as follows:
1. Run a computation (i.e., a subroutine) called RelatedItemRanker (described in detail below) on the current item to yield a ranked set of items that have a relationship to the current item. The computation uses the interest graph to compute a rank for each item indicating how interesting the item is expected to be to the current user. The computation uses a variety of inputs to measure the strength of the relationship, such as textual similarity, the fact that the items are of interest to users with similar behavior, the appearance of the items in the same collections of sub-collections, and so forth. Note that in some embodiments the system will only consider related items that the current user has permission to access.
2. Present the resulting items to the user, sorted, for example, in overall rank order (highest value first).

Other Potential Uses

There are a number of other ways that the system can support browsing and the interest graph powering it can be enhanced in various embodiments of the disclosed technology.

Augment the interest graph computation with real-time feedback. Regularly adjust the algorithms used to compute the interest graph and the weightings based on the effect on user behavior. For example, divide the user community into groups (sometimes called cohorts), present the results of different weights or algorithms to the different groups, and adjust the system based on the most successful approach.

Track more granular user behavior. Follow the mouse movements of a user to get additional information about their interests.

Voting and reputation. By providing ways for users to vote on the contributions of others, the voting patterns resemble commenting patterns, and can be added into the data structures that track interactions between users and measure the influence of a user on others in the community. For example, if one user votes for the contribution of another, the system can treat that the same way as making a comment. Each such vote represents an additional amount of influence that can be added to other indications, such as the number of followers they have or the number of times others commented on an item that a user uploaded.

Rank subsets of an item. Based on the sections of video that other users have watched or otherwise interacted with, and the affinity of the current user to the other users, the system can identify and present the sections within the video most likely to be of interest. Similarly with other media types, like audio, or with components of structured documents, like a CAD diagram, the system can identify a section or sections thereof most likely to be of interest to a particular user. Similarly, the system might rank the pages of a document or the slides in a presentation in terms of which are most likely to interest the user based on the extent to which users have viewed or interacted with portions thereof. These ranks could be used to create a digest (summary) of the item that is faster for users to review, such as a "highlights" synopsis of a video, or a summary document.

Search for derived information. In addition to indexing the contents of an item, the system can apply a variety of computations that derive new information based on the content, and apply the interest graph to searching that derived data. For example, the system can perform voice recognition of an audio or video stream and search the text that it has computed via the voice recognition. The system may perform a dependency analysis on a CAD diagram and include dependent components for a user to browse, even though they are not present in the original diagram. Each of the derived items may be treated as a separate content item for ranking and affinity calculation purposes. The system may perform image recognition and search for the names or characteristics of objects and people that have been recognized.

Incorporate additional sources of social graph information. Patterns of email for each user provide an indication of the topics that they are interested in and the people with whom they interact most frequently. The interest graph could be enhanced by performing content and traffic analysis on email and on aliases that have been set up by users to communicate with each other. Another example is the user directory. Many organizations maintain directories that maintain the membership of users in groups and the relationship between groups. A common example is Active Directory. Such directories are used to enforce access permissions, set up email aliases, and a variety of other purposes. There are also HR and payroll systems that capture relationships among users as well. Another source of information is on-premise server systems. For example, by looking at the permission sets for file systems and the access patterns, additional social information would be available that is similar to what the system tracks internally. Another potential source is public social networks outside of the organization (such as Facebook, Twitter, Instagram, and the like). All of these systems have information about the social graph that could be incorporated into the interest graph. For example, if one user "follows" another person in the company on Twitter, that can be treated similarly to following somebody within the system and incorporated into the interest graph. Likewise when two people are "friends" on Facebook, or otherwise connected on a social networking site, this connection can be included in the interest graph. As another example, comments by one person on an item posted by another, which is similar to commenting on an item published within the system, can be incorporated into the interest graph.

Use role/title information. If users are assigned roles or titles, either by self-selection or by the company, those with similar roles and titles are likely to have some interests in common—another signal that can be incorporated into the interest graph.

Identify similar items as well as true duplicates. Often items are related but not identical. For example, a slide deck that contains some of the same slides as another, but reordered or intermixed with others. Or, a document that has been modified, but much of the substance is the same. Similarity could be used to do more aggressive deduplication, or to identify when content is related, or to identify when users have similar interests because they interact with similar documents as well as identical ones. Another option is to offer users the ability to construct new content from pieces of existing ones. For example, assembling a presentation from slides that come from multiple existing decks. This would reveal the relationships between the assembled and original decks, and would give additional signal on which slides of a presentation are the most valuable.

Additional types of content analysis. There are a variety of ways to analyze content to reveal information that would be useful for the interest graph. For example, performing facial and feature recognition of images. The analysis could be used to find items that are about related topics. Facial recognition could be used to compare content images to user profile pictures, to identify content that is about people in the system. The system could automatically perform language translation on items of particular interest. Or it could create higher resolution previews, or graphical rendering/visualization of data, or create 3D images. The system could automatically perform language translation on items of particular interest or create higher resolution previews, graphical rendering/visualization of data, or 3D images using known techniques.

Proactively get ready to deliver items likely to be of interest. Items likely to be of interest to a user can be downloaded to a device for optimized or offline access, or pre-cached in a content delivery network (CDN) for faster delivery to the browser. A group of items might be presented to the user together for faster viewing.

Target advertisements and promotional offers. The system may target offers to users based on their activities and interests (e.g., the items they are currently browsing). These might be sponsored by the organization they work for, by a partner, or by outside companies. For example, a company might allow vendors to compete for or purchase the right to market services to employees. Similarly, there might be a facility for "sponsoring" particular items and ranking sponsored items higher, highlighting sponsored items visually, indicating the nature of the sponsorship, and so on. Such sponsorship might be done manually, by an algorithm, by a business rule, by an expert system.

Instant search. The system can present search results incrementally as the user is typing, rather than waiting for them to specify a full query.

Semantic search. Search queries can be semantically analyzed using techniques like latent semantic analysis and a variety of natural language processing algorithms that perform operations, such as relationship extraction, named entity recognition, and the like. Then, the system can do specialized operations appropriate for a particular domain or a particular semantic concept. For example, if the system determined that a search applied to a set of legal cases, it might automatically detect references to legal precedents and search through them as well as through the case itself. In manufacturing, the system could identify that a number was a reference to a part and extend its search to include the supporting information for that particular part.

IV. Share

This disclosure describes the creation and use of an interest graph within a company, and between companies, to support sharing information (e.g., business information) via search, browsing, and discovery, and measuring consumption, engagement, and/or influence based on that information. A piece of information is "consumed" when a user views it, listens to it, or otherwise interacts with it. "Engagement" measures user activity against the item—sharing it, adding it to another item collection, commenting on it, and so forth. The amount of "influence" of a user can be measured in a variety of ways. For example, one approach is to count the number of "followers" a person has—the other users who have asked to be notified when the user performs actions like commenting on a document communicating a piece or item of information. An interest graph expresses the affinity between people and information—the likelihood that a particular piece of information is of interest to a particular person. The information might be a document, a presentation, a video, an image, a web page, a report, or the like. The information might also be a collection of items, or a link to a collection of items or to a person. The interest graph is based on an understanding of relationships, monitoring of user behavior, and analysis of each piece of information. The interest graph can represent many kinds of relationships, including: between users and other users, users and items, and users and collections. The interest graph can be computed using data both from the set of items and from user behavior. In some examples, there are three steps for computing the interest graph. The first step is to generate the data; the system provides mechanisms for the user to quickly browse, share, and organize items of information. By using those features, the users create a large amount of usage data, much of which is currently uncollected and unavailable to existing information management and retrieval software. The next step is to gather the data, where the system logs user activities in a set of data structures. The third step is to compute the interest graph. By running a series of computations over the information gathered from users, the system computes data structures that are used for a variety of ranking and search operations. The disclosed techniques honor access restrictions that users specify for each item, so that only authorized people will see any item of information.

Share Via Search

Figure 16:
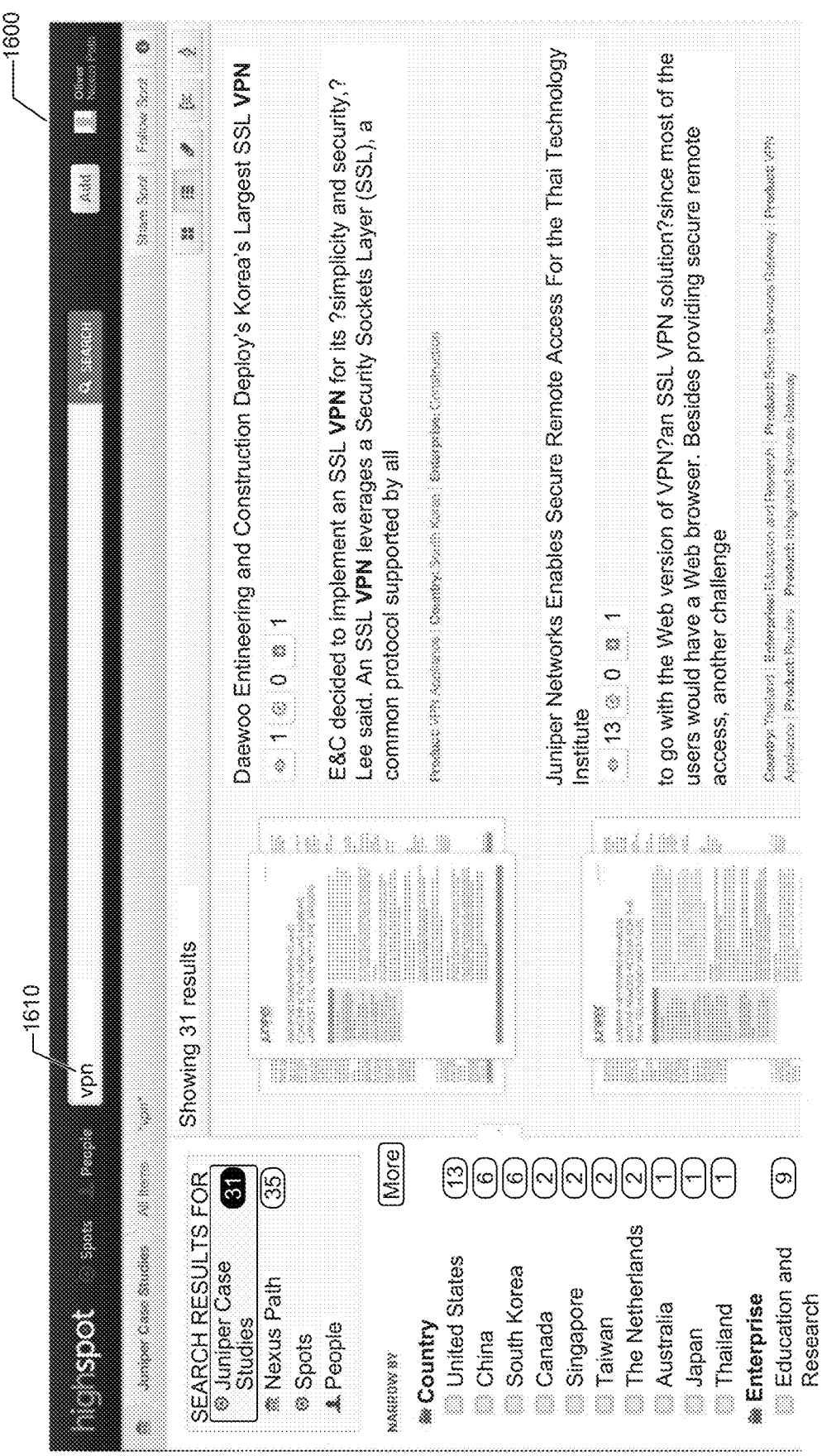
FIG. 16 is a display page illustrating sharing via search.

Search is a common means by which users find items that have been shared with them. FIG. 16 is a display page 1600 illustrating how the disclosed system allows a user to type in a search query and retrieve the most relevant items in accordance with an embodiment of the present technology. The system first identifies those items that match the query, and then ranks them based on how relevant the item is for that query and to that user. In this example, the user has searched for the query string 1610 "vpn", and the system has returned items that contain some reference to that phrase (e.g., an exact match or a partial match), ranked by relevance. Where possible, the system will include a highlighted set of text showing where in the description or contents of that item the query string appeared.

In some examples, ranking of items for a search query is implemented in the system as follows:

1. Determine which items are both accessible to the user and contain words or strings from the search query. This process may be performed using a software package, such as the Lucene software library supported by the Apache Software Foundation. As described below, Lucene computes and uses an inverted index that reports, for every lexeme in the search query, the items that contain that lexeme. This reported set of items is the candidate set of items.
2. Compute a textual rank for each candidate item (i.e., an item in the candidate set) based on a similarity algorithm. This rank is based on the textual contents of the items and on the search phrase.
3. Run a computation (i.e., a subroutine) called ItemRanker (described below) on the candidate set to assign an overall rank to each item. The computation relies on the interest graph and the textual rank to compute the overall rank.
4. Present the resulting items to the user, sorted in overall rank order (highest value first).

Share Via Browsing

Figure 17:
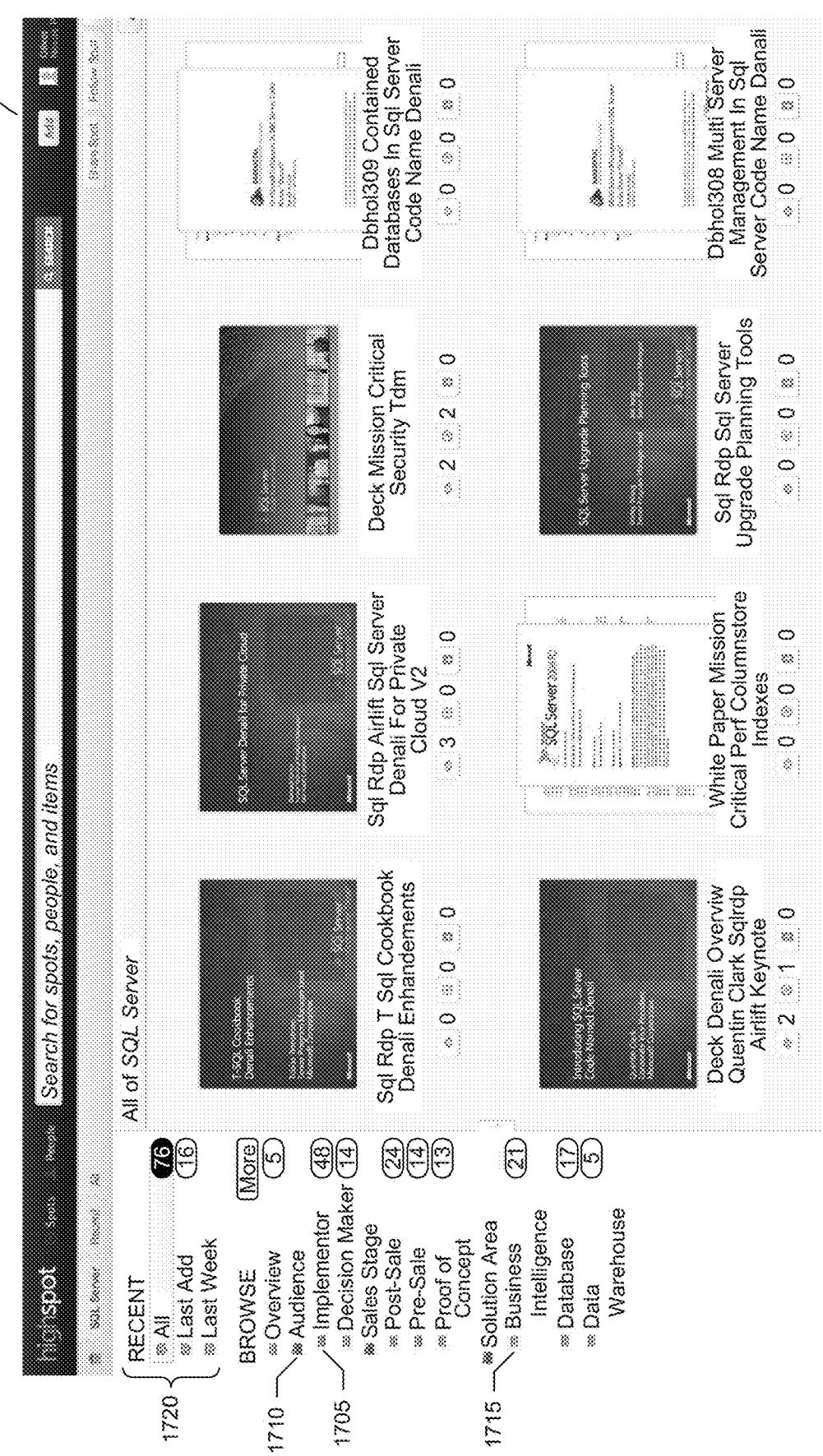
FIG. 17 is a display page illustrating sharing via browsing.

In order to find useful and compelling content online, the system allows users to browse through organized collections of content. In some examples of the disclosed system, the collections are called spots, which can be further organized by placing items of content into spotlists, or lists of items. An item can be placed into any number of spotlists. Spotlists can also be gathered into folders. A user can browse content in many ways, including but limited to: viewing a directory of spots, finding a link to the collection on another spot, having the system suggest a collection, searching, having a link shared with them by another user, and so on. Users can, for example, look at the spot as a whole or look at a sub-collection of the spot by choosing a spotlist or a folder. FIG. 17 shows a spot home page 1700, which is the default view in the system when a user visits a spot in some embodiments. On the left, under the word "Browse", a set of spotlists and folders are presented. For example, the spotlist "Implementor" 1705 is a spotlist with 48 items in it and is in a folder called "Audience" 1710. If the user clicks on a spotlist (e.g., "Implementor," "Decision Maker," "Proof of Concept"), the system displays the items in that list.

At any given time, there is a current set of results, and these are by default presented to the user in relevance order. That order is computed by the interest graph, as described below, can be customized for each user, and is ordered based on what the system knows about that user's interests.

In some examples, the browsing experience is presented to users through a Web experience, as shown in FIG. 17. One of ordinary skill in the art will recognize that the browsing experience can also be presented as an online or offline custom application experience on a PC or on a device (such as a phone or tablet).

In some examples, the ranking of items during browsing is implemented in the system as follows:

4. Determine the set of items in the current result set. This may be based on the user choosing to look at a collection of items (in the system, this is done by visiting a particular spot), or a subset of items (by clicking on a spotlist or folder), or performing a search operation. In the example shown in FIG. 17, the user can also use the selector 1720 ("All Items") in the upper left of the screen to see all the items, only the ones that were last added, or all the ones added during the past week.

5. Run a computation (i.e., a subroutine) called Item-Ranker (described below) on the result set to assign an overall rank to each item. The computation uses the interest graph to compute a rank for each item indicating how interesting it is expected to be to the current user (i.e., the user for whom the items are being ranked).

Note that the activity counts used by ItemRanker, which are stored in the ItemScore data structure, can be multiplied by a fractional value each day. This has the effect of causing older actions to be weighted less than more recent ones (producing exponential effect based on the age in days of the activity). The fractional value determines how quickly the usefulness of older activity attenuates. There are many other algorithms that could be used to calculate the recency of an item, including (but not limited to) using a fixed or adjustable linear scale factor based on the age of the activity, discarding data that is older than a certain window of time, or attenuating the data for a period of time and treating all older activity as equal in weight and hence in importance. Also note that it is possible to use different age algorithms for different computations. For example, the system offers an alternative sort order for items on a spot that biases more for recent activity, by attenuating the weight of older activity more aggressively than it normally does. It is also possible to use different weights in the ranking algorithm for different computations or sort orders.

6. Present the resulting items to the user, sorted in overall relevance rank order (highest value first).

Share Via Discovery

Figure 18:
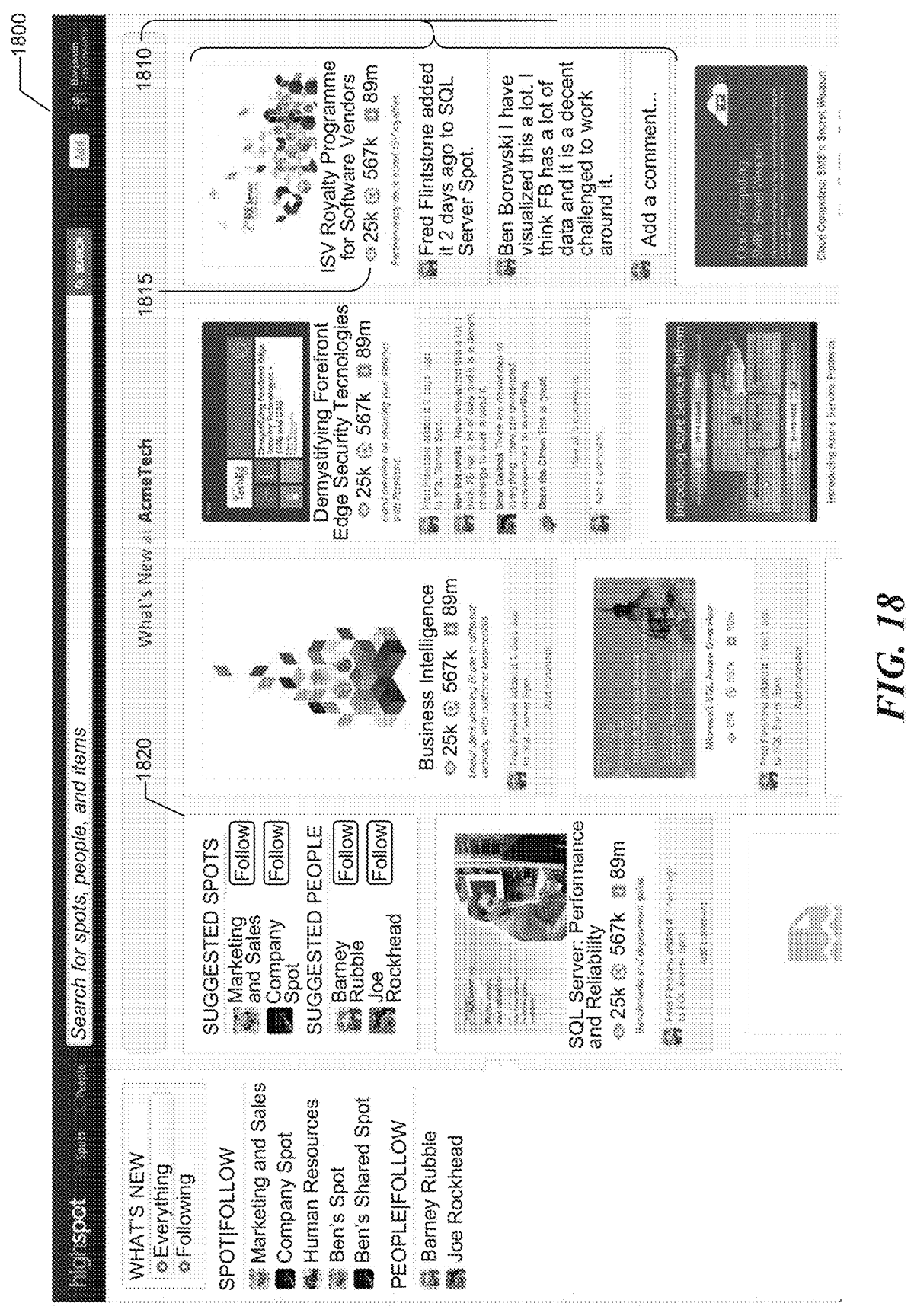

Another way that users find information that has been shared with them is via discovery. The system can automatically suggest items to a user that the user is likely to find interesting, based on what the system knows about the user. FIG. 18 is a display page 1800 illustrating an item feed, a sequence of items, and how users have interacted with those items in accordance with an embodiment of the disclosed technology. For example, the item 1810 has been viewed 25,000 times (the number 1315 next to the icon shaped like an eye), has inspired one comment, and so forth. Also note in the upper left area of the feed, the system suggests people and spots (collections of items) that may be of interest 1820.

In some examples, the system determines what to put in the feed as follows:

1. Determine which items are accessible to the user. This process may be performed using a software package, such as the Lucene software library supported by the Apache Software Foundation. As described below, Lucene computes and uses an index that references items in the system and enumerates a set of people who have access to those items. The set of items accessible to the user is the candidate set.

2. Run a computation (i.e., a subroutine) called Item-Ranker (described below) on the candidate set to assign an overall rank to each item. The computation relies on the interest graph to compute a rank for each item indicating how interesting it is expected to be to the current user.

3. Present the resulting items to the user, sorted in overall rank order (highest value first).

Measuring Consumption, Engagement, and Influence

Figure 19:
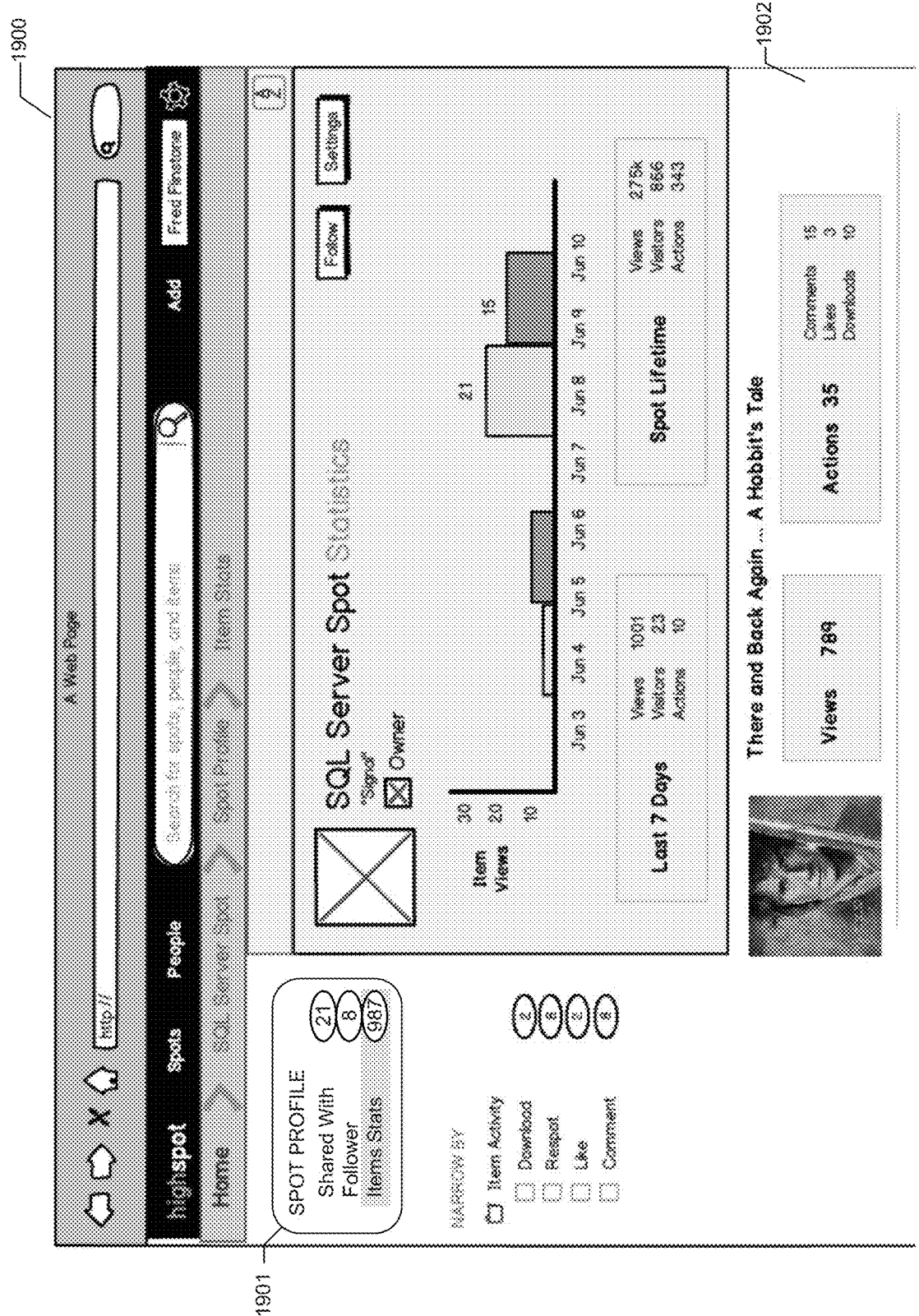
FIG. 19 is a display page illustrating how item and collection statistics are presented.

In some embodiments, the disclosed system allows a publisher to measure the degree to which shared items have been consumed, how engaged members of the community are around the information, and how much influence community members based on information sharing. FIG. 19 is a display page 1900 illustrating statistics for a collection in accordance with an embodiment of the disclosed technology. The summary header 1901 indicates how much activity has been generated by this collection. For example, items from this collection have been viewed 1001 times in the last 7 days and 275,000 times over the lifetime of this collection, or spot. Furthermore, this spot has been shared with 21 users. Rows below the summary header show items in the collection and how much activity each has garnered from the group of users with permission to access it. For example, row 1902 shows that the item labeled "There and Back Again . . . A Hobbit's Tale" has been viewed 789 times and that 35 actions have been performed with respect to this item, including 15 comments, 3 likes, and 10 downloads.

Figure 20:
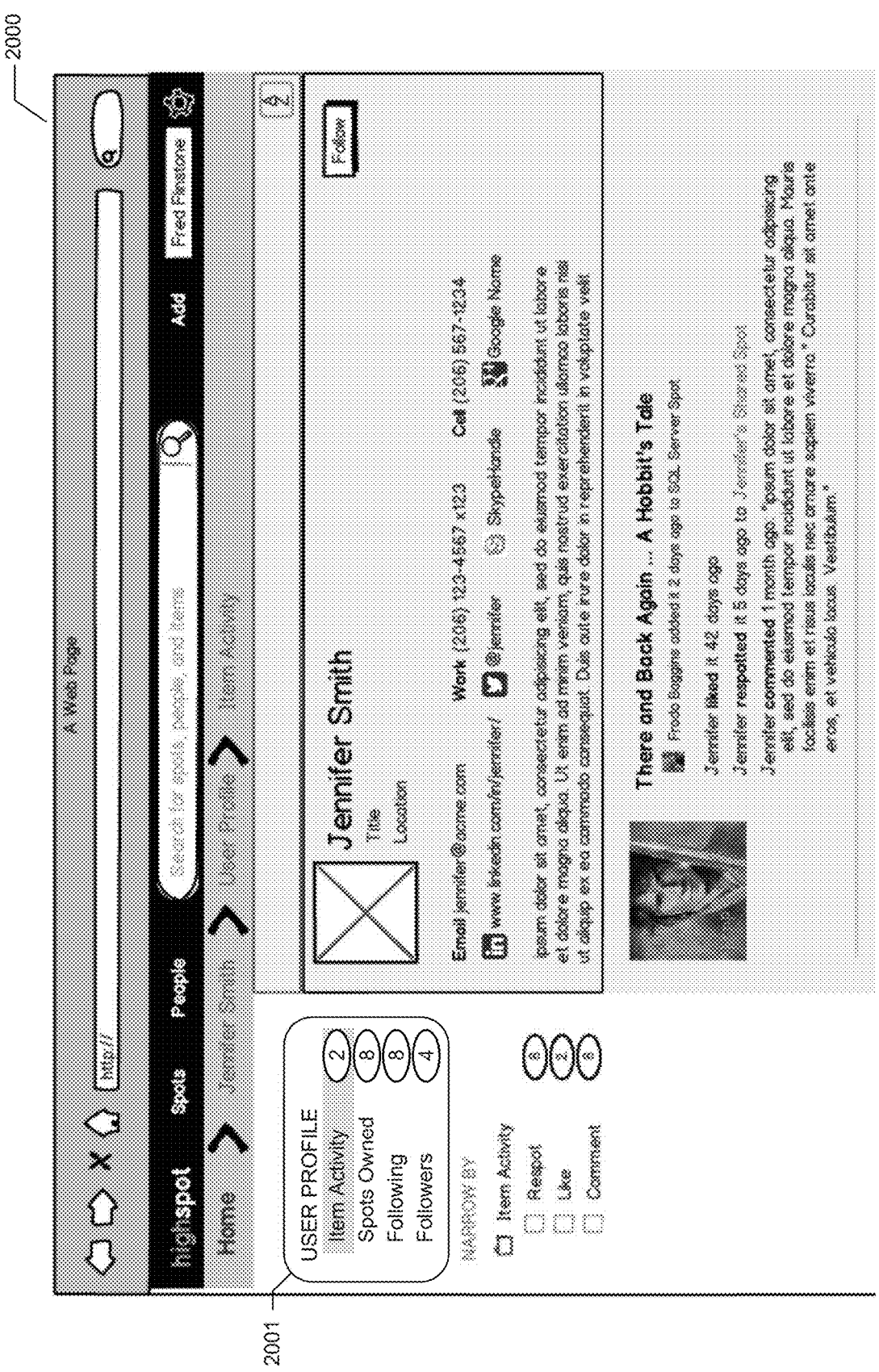
FIG. 20 is a display page illustrating how user activity is presented.

FIG. 20 is a display page 2000 illustrating statistics for an individual in accordance with an embodiment of the disclosed technology. The summary header 2001 shows a basic measure of the community influence and engagement that the corresponding user has (e.g., how many followers the user has and how many other users the user follows). Rows below the summary header show the activities they have performed on various items (which they have commented on, etc.), such as likes, respots, and comments. In addition to the basic statistics, the system may also compute complex measures of influence.

In some examples, the system measures these statistics as follows:

1. Using the ItemScore data structure (described in detail below), report activities performed by a particular user on any item. These are captured by the values in the row U=current user ID (e.g., a row in the data structure corresponding to the current user). The system allows a publisher to sort users based on their activity, revealing the most and least active members.

2. Report on activities performed by any user on a particular item by looking at the values in the column I=item ID (e.g., a column in the data structure corresponding to the item having the item ID). This allows the publisher to determine which items are the most actively consumed and which are the least. The system can sort based on total number of activities or any particular type of activity (e.g., number of views, number of downloads, etc.).

3. Sort the list of users based on the UserInfluence data structure, described below. This will identify the most and least followed and connected users in the community.

Other Potential Uses

There are a number of other ways that the system can support sharing and the interest graph powering it can be enhanced in various embodiments of the disclosed technology.

Auto-categorize content. Based on content analysis and behavioral information, the system could suggest which items have affinity for one another (e.g., items for which interactions are often correlated, items that are regularly viewed together or in sequence, and so on)

and hence would make sense to categorize together. The system could also automatically categorize content without user involvement.

Identify characteristics of high and low value content. The system could do feature analysis to discover what popular items (or unpopular items) have in common and report those commonalities to a user to help the user determine what to share. For example, type of item (presentation vs. document vs. video), length of item, language complexity, role of author, level of categorization, language, or other measurable characteristics. The analysis can be segmented by audience—users in a certain location, or with a certain title, or belonging to a certain group.

A/B testing. The system could allow publishers to set up sharing in different ways and measure effectiveness. There might be multiple versions of an item, or multiple ways to organize items. By presenting these different options to different subsets of the users (one subset would be shown the "A" version, and other would see "B"), the publisher could determine which option led to the greatest level of engagement by users.

Versioning and expiration. By detecting when items have identical or similar content (e.g., two presentations with multiple slides in common, or a document that shares most of its content with another), the system can detect that one item has been updated or has expired and hence the related ones may also be out of date or may need to be updated as well. For identical items, it could update all copies of the content automatically.

Recommended sharing. Based on the content of an item or a collection of items, and the relationships among users, the system could recommend people to include in permission lists for collections. It could also recommend whom to share individual items with.

Identify missing content needed by the community. By looking at the most common search queries that have yielded few to no results, or yielded results that have had few to no views, the system can identify unsatisfied needs of the community. A lack of search results often indicates that the needed material is missing or poorly organized. Where users are not clicking through and consuming the results, the items available may not be satisfying user needs.

Augment the interest graph computation with real-time feedback. Regularly adjust the algorithms used to compute the interest graph and the weightings based on the effect on user behavior. For example, divide the user community into groups (sometimes called cohorts), present the results of different weights or algorithms to the different groups, and adjust the system based on the most successful approach.

Track more granular user behavior. Follow the mouse movements of a user to get additional information about their interests.

Voting and reputation. By providing ways for users to vote on the contributions of others, the voting patterns resemble commenting patterns, and can be added into the data structures that track interactions between users and measure the influence of a user on others in the community. For example, if one user votes for the contribution of another, the system can treat that the same way as making a comment. Each such vote represents an additional amount of influence that can be added to other indications, such as the number of followers they have or the number of times others commented on an item that a user uploaded.

Rank subsets of an item. Based on the sections of video that other users have watched or otherwise interacted with, and the affinity of the current user to the other users, the system can identify and present the sections within the video most likely to be of interest. Similarly with other media types, like audio, or with components of structured documents, like a CAD diagram, the system can identify a section or sections thereof most likely to be of interest to a particular user. Similarly, the system might rank the pages of a document or the slides in a presentation in terms of which are most likely to interest the user based on the extent to which users have viewed or interacted with portions thereof. These ranks could be used to create a digest (summary) of the item that is faster for users to review, such as a "highlights" synopsis of a video, or a summary document.

Search for derived information. In addition to indexing the contents of an item, the system can apply a variety of computations that derive new information based on the content, and apply the interest graph to searching that derived data. For example, the system can perform voice recognition of an audio or video stream and search the text that it has computed via the voice recognition. The system may perform a dependency analysis on a CAD diagram and include dependent components in the feed, even though they are not present in the original diagram. Each of the derived items may be treated as a separate content item for ranking and affinity calculation purposes. The system may perform image recognition and search for the names or characteristics of objects and people that have been recognized.

Incorporate additional sources of social graph information. Patterns of email for each user provide an indication of the topics that they are interested in and the people with whom they interact most frequently. The interest graph could be enhanced by performing content and traffic analysis on email and on aliases that have been set up by users to communicate with each other. Another example is the user directory. Many organizations maintain directories that maintain the membership of users in groups and the relationship between groups. A common example is Active Directory. Such directories are used to enforce access permissions, set up email aliases, and a variety of other purposes. There are also HR and payroll systems that capture relationships among users as well. Another source of information is on-premise server systems. For example, by looking at the permission sets for file systems and the access patterns, additional social information would be available that is similar to what the system tracks internally. Another potential source is public social networks outside of the organization (such as Facebook, Twitter, Instagram, and the like). All of these systems have information about the social graph that could be incorporated into the interest graph. For example, if one user "follows" another person in the company on Twitter, that can be treated similarly to following somebody within the system and incorporated into the interest graph. Likewise when two people are "friends" on Facebook, or otherwise connected on a social networking site, this connection can be included in the interest graph. As another example, comments by one person on an item posted by another, which is similar to commenting on an item published within the system, can be incorporated into the interest graph.

- Use role/title information. If users are assigned roles or titles, either by self-selection or by the company, those with similar roles and titles are likely to have some interests in common—another signal that can be incorporated into the interest graph.
- Identify similar items as well as true duplicates. Often items are related but not identical. For example, a slide deck that contains some of the same slides as another, but reordered or intermixed with others. Or, a document that has been modified, but much of the substance is the same. Similarity could be used to do more aggressive deduplication, or to identify when content is related, or to identify when users have similar interests because they interact with similar documents as well as identical ones. Another option is to offer users the ability to construct new content from pieces of existing ones. For example, assembling a presentation from slides that come from multiple existing decks. This would reveal the relationships between the assembled and original decks, and would give additional signal on which slides of a presentation are the most valuable.
- Additional types of content analysis. There are a variety of ways to analyze content to reveal information that would be useful for the interest graph. For example, performing facial and feature recognition of images. The analysis could be used to find items that are about related topics. Facial recognition could be used to compare content images to user profile pictures, to identify content that is about people in the system. The system could automatically perform language translation on items of particular interest. Or it could create higher resolution previews, or graphical rendering/visualization of data, or create 3D images. The system could automatically perform language translation on items of particular interest or create higher resolution previews, graphical rendering/visualization of data, or 3D images using known techniques.
- Proactively get ready to deliver items likely to be of interest. Items likely to be of interest to a user can be downloaded to a device for optimized or offline access, or pre-cached in a content delivery network (CDN) for faster delivery to the browser. A group of items might be presented to the user together for faster viewing.
- Target advertisements and promotional offers. The system may target offers to users based on their activities and interests (e.g., the items they are currently browsing). These might be sponsored by the organization they work for, by a partner, or by outside companies. For example, a company might allow vendors to compete for or purchase the right to market services to employees. Similarly, there might be a facility for "sponsoring" particular items and ranking sponsored items higher, highlighting sponsored items visually, indicating the nature of the sponsorship, and so on. Such sponsorship might be done manually, by an algorithm, by a business rule, by an expert system.
- Instant search. The system can present search results incrementally as the user is typing, rather than waiting for them to specify a full query.
- Semantic search. Search queries can be semantically analyzed using techniques like latent semantic analysis and a variety of natural language processing algorithms that perform operations, such as relationship extraction, named entity recognition, and the like. Then, the system can do specialized operations appropriate for a particular domain or a particular semantic concept. For example, if the system determined that a search applied to a set of legal cases, it might automatically detect references to legal precedents and search through them as well as through the case itself. In manufacturing, the system could identify that a number was a reference to a part and extend its search to include the supporting information for that particular part.

Creating the Interest Graph

Figure 7:
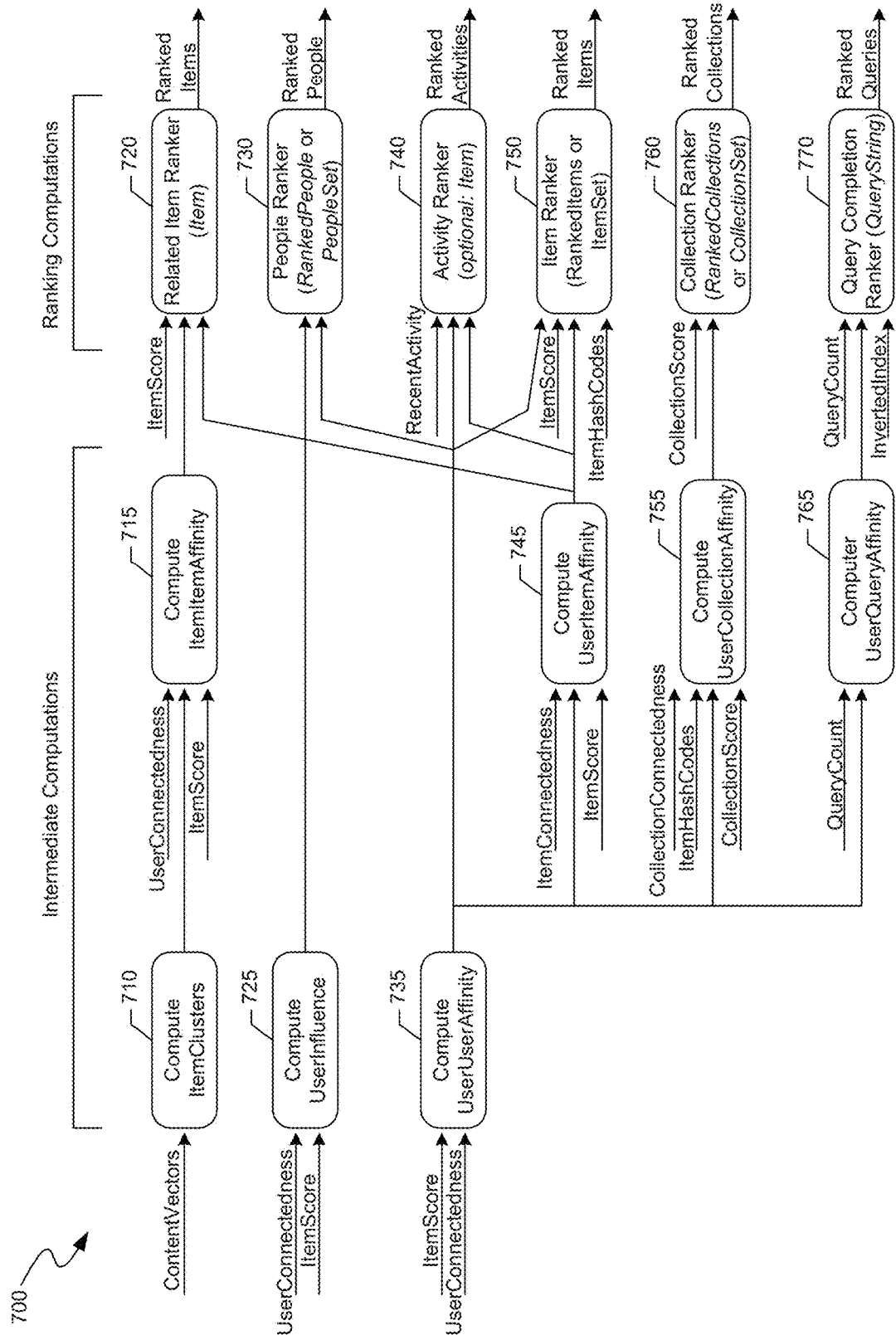
FIG. 7 is a block diagram illustrating processing of the system for creating an interest graph.

The choice and ordering of information items relies on the interest graph. FIG. 7 is a block diagram illustrating process 700 of the system for creating an interest graph in accordance with some embodiments of the disclosed technology. In some examples, the process of building the interest graph includes generating the data, gathering the data, and computing the interest graph.

Step 1: Generating the Data

In some examples, an interest graph is computed from a number of different data sources and benefits greatly from having additional data to analyze. Machine learning research and practice consistently shows that accuracy improves as the number of data sources and the amount of data increases. This is referred to as user signal.

Therefore, step 1 is generating the data, which means encouraging users to engage in activities that generate signal. Historically, activities that provide the most useful data have been overly complex inside of companies, and hence have not occurred as often as they otherwise might.

For example, sharing files with others in a rich online experience (like a web site that offers a structured view, supports search, and enables browsing) has been cumbersome to set up. As a result, people often settle for simple sharing solutions, such as relying on email attachments or on keeping their files in a shared disk drive. The disclosed system provides a simple and easy-to-use sharing solution that encourages users to interact more heavily with each other's information and hence to generate more signal.

Browsing files on a web site generally involves downloading them to the local computer and viewing them in a program like Microsoft Word or PowerPoint, which is quite slow. Accordingly, users are discouraged from browsing as many items as they might otherwise do. The disclosed system provides a much faster way to browse (called "skim" preview), which offers very fast viewing of items and collections of items. Skim allows users to explore information online without requiring them to download anything or launch any applications on their machine, encouraging far more browsing. Skim preview works by tracking the way that the user slides their mouse across the item's thumbnail. Based on how far the mouse has moved horizontally across the thumbnail, a preview of that part of the item is shown. For example, if the user is running the mouse over the thumbnail for a presentation, as the mouse moves left to right, each slide of the presentation is shown in succession. By sliding the mouse back and forth, at any desired speed, the user can quickly view all the slides. Similarly, for a document, the thumbnails show each page of the document. There is an equivalent browsing experience for each type of information supported by the system. In seconds, the user can see every part of the item—it is much faster than the traditional method of downloading the file to a client application.

Another example is organizing information. The traditional approach is to use a directory structure, which provides a limited way to establish a taxonomy and to associate related files. Another approach is to use metadata tagging, where items are assigned a set of properties. These systems have been deployed extensively within companies and are generally felt to be rigid and awkward—most users resist them and the vast majority of information is never put into them. The disclosed system offers lists and folders that support dragging and dropping items into multiple places, a model that is familiar to users from other domains like organizing music into playlists. The system offers three levels of hierarchy: (1) spots, which are collections of items that can be found via a directory or search, (2) folders, which exist within a spot and optionally allow users to group a set of lists together, and (3) lists, which are simple groups of items. An item can be in zero, one, or many different lists. Users can place individual items into lists or can drag a group into a list. This is a much simpler structuring model than is traditionally used by systems like enterprise content managers. Each user can create their own hierarchy, if they wish, and can take an item from one spot and put it into another one (using an operation called respot). So users might create a spot called "Widget Marketing", which contains the marketing material for widgets. Within that spot, they might have a folder called "vertical markets" containing lists, such as "manufacturing", "media", etc. They might have another folder called "sales stage" with lists, such as "pre-sale", "proof-of-concept", "post-sale." Any piece of information can be put into any number of lists, allowing for a flexible browsing experience based on spots, folders, and lists.

The first step towards creating an effective interest graph is to provide an information management environment that makes it much easier and faster for users to engage in useful data-generating activities and generate user signal to be analyzed.

Step 2: Gathering the Data

The next step is to gather the data. Producing an accurate interest graph relies on detailed analysis of data from a variety of sources. Table 1, at the bottom of this section, lists and defines input data structures used by the system.

User Behavior

A source of data is the way that users interact with each piece of information. The system tracks actions that a user performs on any item (share, download, copy from one collection to another, recommend, comment, etc.) and monitors how much time they spend looking at each part of a document, presentation, video, training program, or the like.

Traditional content systems invoke other programs when users wish to view the contents of a document—for example, such an environment might download a presentation and invoke Microsoft PowerPoint to let the user read it. What users do inside of a program like PowerPoint is usually opaque to the content manager. And, most such editing programs (e.g., word processors or presentation programs) do not track and report which parts of the file users spend time on, and how much time. Therefore user engagement with each piece of information does not generate any signal that can be analyzed.

The disclosed system presents high resolution previews and views of various document types that are available online and, in some embodiments, can be quickly browsed using skim preview—which can be accomplished in the web browser, so that no additional software download is required, and no software applications need to be installed or invoked on the user's machine other than the web browser. The system monitors views and previews, tracking how often they happen and how long the user spends looking at any part of the item.

The actions that users have taken on items and their viewing behavior are captured in the ItemScore, CollectionScore, and RecentActivity data structures. In addition, the system creates a feedback loop—whenever it presents items that might be of interest to the user, the click-through behavior is tracked in ClickThroughs.

Item Analysis

The system extracts data by analyzing each item of information:

In some examples, the system uses an information retrieval library, such as the Lucene software package supported by the Apache Software Foundation, to parse text, apply Porter stemming analysis, create an inverted index, and compute a similarity score for a query string against the index. The index tracks the number of times each word appears and also records collections of words that appear together, to support searching for phrases. Each word in the index is stemmed, meaning that it is divided into its component parts. This allows, for example, a search for the word "run" to match a document that contains "running." Note that one of ordinary skill in the art will recognize that there are a variety of other algorithms for stemming (e.g., suffix-stripping and lemmatization), assembly of the index (e.g., a suffix tree or n-gram tree), and scoring a query (e.g., compression distance, Dice's coefficient) that would also serve. This information is stored in InvertedIndex.

For each item, the system computes a content vector that expresses how many times any particular word appeared in it. The result is stored in ContentVectors.

Each piece of metadata is extracted—documents created within Microsoft Office, for example, have a section that captures tags like the author, date, description, and so forth. A similar model exists for images in JPEG format and for many other file types. The resulting <field name, value> pairs are added to InvertedIndex.

For each piece of information, the system computes a large hash function of the contents of the document (using, for example, the SHA-256 algorithm, although there are a variety of cryptographic hash functions with low collision rates that would also serve). The hash is, with high probability, unique for each piece of content in the system and allows the system to quickly recognize when the same item has been added to the system multiple times, by the same or by different users. The hashes are stored in ItemHashCodes.

Social Graph

Another valuable clue to user interest is the set of people to whom they are connected. The system computes the social graph, which captures the connections between people. Such connections can take many different forms; for example:

They may both belong to the same group of users.

They may both have similar access permissions to a collection of items. The strength of this indicator is inversely proportional to the number of other people who have similar permissions. In other words, if only two people have access to a body of documents, that is a much stronger indicator of mutual interest than if two people have access to information that is also available to hundreds or thousands of other people.

A user A may choose to follow another user B, which means that user A will be notified when user B performs certain kinds of actions. This creates an asymmetrical connection—user A is likely to be interested in something that user B cares about, but it is weaker evidence that user B will share interests with user A.

A user may own a collection of information and grant access to another.

A user may invite another user to join the service—accepting that invitation represents a stronger connection than simply receiving it.

A user may have created a link to another user.

The system examines the social graph, distilling it into UserConnectedness.

Information Graph

The system has a variety of ways that information can be categorized—it provides a hierarchy of collections and any piece of information can be in any number of those collections. One collection may have a link to another. As a result, there is also an information graph capturing the relationships between items of information. The system stores that graph in the ItemConnectedness data structure. Different types of collections imply different levels of relationship between the items.

Similarly, the system aggregates these individual relationships between items into a measure of connectedness between collections, stored in CollectionConnectedness.

Queries

The system offers search, both within a collection and across many of them. There is valuable information in the phrases that users search on, and their subsequent decisions whether or not to click through on the results presented. The system keeps track of queries that have been performed in QueryCount, the ones that are most popular (e.g., top 10, top 20%, top 15 in the past 24 hours) in PopularQueries, and the subsequent click-through decisions by users in ClickThroughs.

TABLE 1

| Input Data Structures |
| --- |
| ItemScore - total activity applied to an item by each user<br>ItemScore is an array [U, I] of tuples, where U is the number of users in the system and I is the number of items.<br>Each tuple = <weightedsum, <$action_1$, $action_2$, . . . , $action_n$>, views, <$preview_1$, $preview_2$, . . . , $preview_m$>><br>The tuple contains a count of each allowed type of action for an item (e.g. "downloaded"), a count of the number of times it is viewed, and a count of the amount of time each part of it (e.g. a page of a document) was previewed. The tuple also contains a weighted sum of these counts; weights are adjusted depending on the relative importance of each of the counts.<br>CollectionScore - total activity applied to a collection of items by each user<br>CollectionScore is an array [U, C] of element, where U is the number of users in the system and C is the number of collections. Each element is the same tuple as for ItemScore.<br>RecentActivity - a log of recent activities each user has done with every item<br>RecentActivity is an array [U, I] of tuples, where U is the number of users and I is the number of items.<br>Each tuple = <<$action_1$, $timestamp_1$>, <$action_2$, $timestamp_2$>, . . . <$action_n$, $timestamp_n$>><br>The tuple is the set of recent actions performed by the user on the item, each with a time stamp.<br>ClickThroughs - a log of the result when each item was presented to each user<br>Clickthroughs is an array [U, I] of tuples, where U is the number of users and I is the number of items.<br>Each tuple = <<context, $position_1$, click_$number_1$>, . . .><br>The tuple contains the set of times this item was presented to this user. The system records the context (e.g. "search query"), the position of the item in the presented list (e.g. "the item was the third result"), and which of the selected items from that result set it was (e.g. "the item was selected second" or "the item was never selected").<br>ContentVectors - a representation of the content of every document. In some examples, the system uses the Mahout software package developed by the Apache Software Foundation to create a normalized vector space model (VSM) representation for every item, using term-frequency inverse document frequency (TF-IDF) weighting to compute the values in each vector. Collocation-based n-gram analysis with log-likelihood ratio test improves the accuracy of the weighting. There are other algorithms for vectorizing content that would also serve.<br>ContentVectors is an array [I, T] of values, where I is the number of items and T is the number of n-gram terms that appear in any of those items. The value is a weighted count of the number of times that term appears in that item.<br>InvertedIndex - an index of a set of documents<br>In some examples, the disclosed system uses the Lucene indexing package to create an inverted index from a set of documents. This index contains every lexeme that appears in any item. For each lexeme, Lucene enumerates the set of documents that contain the lexeme. Each document is also annotated to reflect the set of individuals who are allowed to access it, and the Lucene search contains a mask to choose those items that are visible to the user.<br>ItemHashCodes - a pointer to the items corresponding to any hash code present in the system<br>The system computes a cryptographic hash value of the contents of every item. In some examples, the system uses SHA-256, but there are a variety of other algorithms that similarly compute a value for any item that has a very low probability of colliding with the value for any other.<br>ItemHashCodes is an array [H] of item lists, where H is the number of unique hash values present across all items. List contains the set of items that correspond to that hash value.<br>UserConnectedness - the degree to which each user is connected to every other user in the social graph<br>UserConnectedness is an array [U, U] of tuples, where U is the number of users.<br>Each tuple = <weightedsum, <$strength_1$, $type_1$>, <$strength_2$, $type_2$>, . . .>> |

TABLE 1-continued

Input Data Structures

The tuple enumerates the strength and type of each connection between this pair of
users (from X -> Y, if the tuple is element [X, Y] of the array). The type might be
"appear in the same access control list" or "X invited Y to join the community and that
invitation was accepted". The strength can be the same for every connection of a
particular type or it can be weighted (e.g. "the value is one divided by the number of
people on the shared access control list"). The system computes a weighted sum
across the connections, factoring in their strengths.
ItemConnectedness - the degree to which every item is connected in the information
graph to every other item.
ItemConnectedness is an array [I, I] of tuples, where I is the number of items. The tuple
has the same form as the one for UserConnectedness.
CollectionConnectedness - the degree to which each collection of information is
connected to every other collection.
CollectionConnectedness is an array [C, C] of tuples, where C is the number of
collections. The tuple has the same form as the one for UserConnectedness.
QueryCount - the queries that have been executed
QueryCount is an array [Q, U] of tuples, where Q is the number of queries that have
been executed on the system and U is the number of users.
Each tuple = <querystring, count, <<clickeditem$_1$, click$_1$>, <clickeditem$_2$, click$_2$>, . . .>
The tuple expresses the number of times that user U has executed query Q.
querystring is the text of the query, count is the number of times the query was
executed, and the next value is the set of results from those queries. Each item in the
set is a pair - the item that was clicked, and its position in the clickstream of user
choices (e.g. "first item clicked", "second item clicked", etc).

Step 3: Computing the Interest Graph

In some examples, the system computes the interest graph by taking the raw user signal (captured in the input data structures described in the previous section) and processing that data through a series of intermediate computations.

Each of the intermediate computations is called "Compute <X>", where <X> is the name of the output that it generates. For example, "Compute UserUserAffinity" produces the UserUserAffinity data structure. The system runs these intermediate computations at periodic intervals and the outputs are updated over time as additional user data is gathered. Table 2 enumerates the intermediate data structures that are produced by these algorithms.

ranking, where <Y> represents the kind of values being ranked (e.g., RelatedItemRanker ranks related items). Ranking computations are given an argument and then compute a set of ranked results based on that argument and on a set of other inputs.

FIG. 7 is a block diagram illustrating processing of the system in some examples. FIG. 7 shows the processing steps of the system and how the data flows through the system. Each named arrow represents an input data structure capturing raw user signal. Each rounded rectangle represents a computation. For example, "Compute ItemClusters" 710 is an intermediate computation with one input, the Con-

TABLE 2

Intermediate Data Structures

UserInfluence - measure of how much social influence each user has on others
UserInfluence [U] is an array of real numbers representing the influence of each of the
U users in the system.
<X><Y>Affinity - a measurement of the affinity for every X to every Y
These are a family of data structures that represent affinity - the likelihood of a user to
be interested in another user, an item, or a collection, or the likelihood that an interest in
one item implies an interest in another. In each case, affinity can be represented as a
real number from 0 to 1 on a logarithmic scale, where 1 represents extremely strong
predicted affinity and 0 represents none. Note that an alternative model is to make zero
represent "no information," negative numbers represent negative affinity (the belief that
an item of not likely to be of interest), and positive numbers represent positive affinity.
UserUserAffinity is an array [U, U] with affinity from every user to every other
user
UserItemAffinity is an array [U, I] with affinity from every user to every item
UserCollectionAffinity is an array [U, C] with affinity from every user to every
collection
ItemItemAffinity is an array [I, I] with affinity from every item to every other item
ItemClusters - divides the items in the system into clusters whose content is related
ItemClusters is an array [I] of tuples, where I is the number of items.
Each tuple = <<cluster$_1$, membershipweight$_1$>, <cluster$_2$, membershipweight$_2$>, . . .>
The tuple enumerates the clusters that the item is in and the weight of the item's
membership to each cluster. In some examples, the system uses a non-uniform weight
(so called "fuzzy clustering"), though it is also possible to make membership boolean.

When the system displays a set of values to the user, it invokes one of the ranking computations. In some examples, the names of these ranking computations takes the form "<Y> Ranker", depending on what kind of values they are tentVectors data structure. Its output (ItemClusters) is fed into the "Compute ItemItemAffinity" 715 computation, along with two other inputs—the ItemConnectedness and the ItemScore data structures.

The system uses the ranking computations to produce output that users can see. For example, suppose the user is looking at an item, and the system wants to display a set of related items next to it. The goal is to identify the items that are most likely to interest the user. For example, if a salesperson is looking at a presentation about a particular product, they might also be interested in a price sheet for the product, white papers on how to use that product most effectively, presentations and documents about related products that work with it, etc.

The system uses the ranking computation called RelatedItemRanker 720 to identify and rank related items. When the user pulls up a particular item on a web site, the system hands that item to RelatedItemRanker, which returns the ranked set of items (in a RankedItems data structure) that it has identified as being most likely to be of interest to the user. The computation relies on one input data structure—the popularity of items (ItemScore) and the results from two intermediate computations—the likelihood that the current user would be interested in any particular item (UseritemAffinity), and the degree of similarity between any two items (ItemitemAffinity).

The following data structures are used to hold groups of different types.

TABLE 3

Group Data Structures

<value>Set - a set of <values>
This family of data structures holds an unordered set of items of type <value>.
ItemSet is an array [I] of items, PeopleSet is an array [P] of people, and CollectionSet is an array [C] of collections
Ranked<value> - a set of <values>, with an associated ranking
This family of data structures holds a set of items of type <value> with an associated rank that represents an ordering. Note that ranks are real numbers, allowing the structure to both establish an ordering and to measure the "distance" between two items in terms of their rank.
RankedItems is an array [I] of ranked items, RankedPeople is an array [P] of ranked people, RankedCollections is an array [C] of collections, RankedQueries is an array [Q] of ranked queries, and RankedActivities is an array [A] of ranked activities Intermediate Computations These computations operate on input data structures and on the results produced by other intermediate computations. In each case, they produce a data structure as output with the results.

These functions or algorithms compute the degree of affinity between pairs of things. "Affinity" means the likelihood that interest in one of those items means interest in the other. Note that affinity is not symmetrical; a salesperson who is looking at a particular product description might be highly likely to look at the price sheet containing that product (among hundreds of others), but somebody looking at the price sheet is much less likely to care about any particular product's description.

Compute ItemClusters

This algorithm operates on ContentVectors, applying a clustering algorithm to compute ItemClusters that represent groups of items that have related textual content. In some examples, the system uses the Mahout software package to perform this computation, applying canopy generation to identify cluster centroids, then using k-means clustering based on the cosine of the Euclidean distance between documents as a similarity metric. One of ordinary skill in the art will recognize that other clustering algorithms can be used.

Compute ItemitemAffinity

This algorithm computes the degree of affinity between pairs of items in the system.

The inputs are ItemConnectedness (the degree to which the items are "close" in the information graph), ItemScore (the amount of interactions users have had with items), and ItemClusters (the degree to which the contents of items are related). Here is the algorithm:

```
Compute_ItemItemAffinity(ItemConnectedness, ItemScore, ItemClusters)
{
    FrequentGroups = AssociationRuleAnalysis(ItemScore)
    For every pair of items (I, J)
        ItemItemAffinity[I, J] =   A * ItemConnectedness [I, J] +
                                   B * ItemScore [*, J].weightedsum +
                                   C * number of appearances of I & J in FrequentGroups
}
```

AssociationRuleAnalysis determines which pairs of items are frequently viewed together. In some examples, the system uses the algorithm known as Apriori to determine these pairs. One of ordinary skill in the art will recognize that there are a variety of similar algorithms that could also be used. The weighting parameters A, B, and C allow the system to balance the importance of items being placed in related collections, the popularity of particular items with users, and the degree to which other users have viewed both items.

Compute UserUserAffinity 735

This algorithm computes the degree of affinity between pairs of users—the likelihood that each user is interested in what the other one does. The inputs are ItemScore (which captures how users have interacted with items) and UserConnectedness (the degree to which they are connected in the social graph). The algorithm is:

```
Compute_UserUserAffinity(ItemScore, UserConnectedness)
{
    UserBehaviorSimilarity =   PearsonCorrelation(ItemScore)
    For every pair of users (I, J)
        UserUserAffinity[I, J] =   A * UserBehaviorSimilarity [I, J] +
                                   B * tanh(UserConnectedness [I, J])
}
```

The system uses, for example, the Mahout software to compute the Pearson correlation of behavior across the weighted sum of item scores. The user connectedness value is normalized into the range 0-1 using hyperbolic tangent. Then the values are weighted, to reflect the relative importance of behavior vs. the social graph. The weighting parameters A and B allow the system to balance the importance of these values. Note that one of ordinary skill in the art will recognize that numerous other algorithms can be used to compute behavioral similarity (e.g., Euclidean distance or the Tanimoto Coefficient) and normalization (e.g., the logistic function or Z-scores).

Compute UseritemAffinity 745

This algorithm computes the degree of affinity between every user and every item in the system. The inputs are UserUserAffinity (from above), ItemScore, and ItemConnectedness. The algorithm is:

```
Compute_UserItemAffinity(UserUserAffinity, ItemScore, ItemConnectedness)
{
  For every item I, for every user U {
    ActivitySum = UserInterest = 0
    For every user U2
      ActivitySum += UserUserAffinity[U, U2] * ItemScore[I, U2].weightedsum
    For every item I2
      UserInterest += ItemScore[I2, U] * tanh(ItemConnectedness [I, I2])
    UserItemAffinity[U,I] = A *ActivitySum + B * UserInterest
  }
}
```

The system computes the sum of the activity that other users have performed on the item (weighted by affinity to those users) and the sum of item activities that the current user has performed (weighted by the affinity of the current item to those other items). Those two values are combined in a weighted sum, based on the relative importance of behavior vs. item connectivity. In some examples, connectedness is normalized using hyperbolic tangent, but one of ordinary skill in the art will recognize that other algorithms could be used.

Compute UserCollectionAffinity 755

This algorithm computes the degree of affinity between every user and every collection, where a collection is a grouping of items. Note that collections can overlap, can be organized into a hierarchy, or can be disjoint—the model works in any of those cases. The inputs are UserUserAffinity (from above), CollectionConnectedness (the degree to which collections are connected), ItemHashCodes (the hash values of every item), and CollectionScore (the activities user have performed on each collection). The algorithm is:

```
Compute_UserCollectionAffinity(UserUserAffinity, CollectionConnectedness,
{
  For every collection C, for every collection C2 {
    For every item I in C, for every item I2 in C2
      if (ItemHashCode[I] = ItemHashCode[I2])
        CollectionSimilarity [C, C2] += SharedItemWeight
  }
  For every collection C, for every user U {
    ActivitySum = UserInterest = 0
    For every user U2
      ActivitySum += UserUserAffinity[U, U2] * CollectionScore[C, U2].weightedsum
    For every collection C2
      UserInterest += CollectionScore[C2, U] *
        (tanh(CollectionConnectedness [C, C2]) +
          CollectionSimilarity [C, C2])
    UserCollectionAffinity[U,C] = A * ActivitySum + B * UserInterest
  }
}
```

The system computes the frequency with which the same item appears in every pair of collections, using a constant weight. The system then computes the sum of the activity other users have performed on the collection (weighted by the affinity to those users) and the sum of collection activities that the current user has performed (weighted by the affinity of the current collection to those collections based on both behavior and similarity of content). Note that connectedness is normalized using hyperbolic tangent, but other algorithms could be used. These values are then combined in a weighted sum, where the weights reflect the relative importance of user behavioral similarity vs. structural relationships and similarity of content.

Compute UserQueryAffinity 765

This algorithm computes the degree of affinity between every user and every query that has been executed on the system. The inputs are UserUserAffinity (from above) and QueryCount (a summary of the queries that have been executed by each user). The algorithm is:

```
Compute_UserQueryAffinity(UserUserAffinity, QueryCount)
{
  For every query Q, for every user U {
    ActivitySum = 0
    For every user U2
      ActivitySum += UserUserAffinity [U, U2] *
        QueryCount[Q, U2].count
    UserQueryAffinity[Q, U] = A * ActivitySum
  }
}
```

The system computes the sum of the number of times other users have executed this particular query, weighted by the affinity with that other user. The result is then multiplied by a weight to compute affinity for this user and the query.

Compute UserInfluence

This algorithm computes the amount of influence that each User has within the community of users on the system. Its inputs are UserConnectedness (the degree of connectivity in the social graph), and ItemScore. The algorithm is:

```
Compute_UserInfluence(UserConnectedness, ItemScore)
{
  For every user U, for every user U2
    UserInfluence[U] += A * UserConnectedness.weightedsum[U, U2]
```

```
For every user U, for every item I that user U was responsible for
creating
    For every user U2
        UserInfluence[U] += B * ItemScore[I, U2].weightedsum
}
```

The system computes a weighted sum of how connected other users are to a particular user, and for how much activity has been generated by the items that the particular user created.

Ranking Computations

The ranking computations produce ranked lists of items; a typical use for ranking computations is to produce lists that are displayed to users in various contexts. For example, ItemRanker is used in deciding which items to display to users as the result of a search query. ItemRanker takes candidate items that might match the query, and orders them appropriately.

Each ranking computation is invoked on an input. Using that input and data structures that are passed to it (per the workflow in FIG. 7), the computation produces a ranked set as the output.

Related Item Ranker 720

This algorithm is invoked on an item and also gets ItemScore, ItemItemAffinity, and UserItemAffinity. The algorithm is:

```
RelatedItemRanker(Item, ItemScore, ItemItemAffinity, UserItemAffinity)
{
    For each item I
        Score = 0
        For each user U
            Score += ItemScore[I, U].weightedsum
        RankedItems[I].rank = (A * Score) * (1 + ItemItemAffinity[Item, I]) +
                              (B * UseItemAffinity[CurrentUser, I])
}
```

The system finds the items most related to Item by computing a weighted sum. The factors are the total amount of user activity against other items, weighted by the affinity of those other items to this one, and the current user's affinity to the item.

Activity Ranker 740

When this algorithm is invoked, it is optionally given an item and also gets RecentActivity (the set of activities that have recently been performed on the system, such as the set of activities performed during the last year, month, week, day, hour, or portion thereof), UserUserAffinity, and UserItemAffinity. If an item is provided, it returns the set of activities that have been performed on that item, ranked in terms of how likely they are to interest the current user. If no item is provided, it returns the list of activities on any item in the system, ranked in terms of how likely they are to interest the current user. The algorithm is:

```
ActivityRanker(optional: Item, RecentActivity, UserUserAffinity, UserItemAffinity)
{
    if Item was provided
        RankedActivities = set of activities in RecentActivity performed on Item
    else
        RankedActivities = RecentActivity
    For each activity A in RankedActivities
        RankedActivities[A].rank =  B * ActivityValue(A)*
                                    (C * (1 + UserUserAffinity[CurrentUser, A.user])) *
                                    (D * (1 + UserItemAffinity[CurrentUser, A.item]))
}
```

The system chooses a candidate set of activities. For each activity in the candidate set of activities, the system computes a ranking using a weighted product of the intrinsic interest for that type of activity, the affinity of the current user with the user who performed the activity, and the affinity of the current user for the item on which the activity was performed.

Item Ranker

This algorithm is invoked on a set of items, which is either unranked (an ItemSet) or already ranked with a preliminary ranking (a RankedItems set) and also gets ItemScore, ItemHashCodes, and UserItemAffinity. The algorithm is:

```
ItemRanker(InputSet, ItemScore, ItemHashCodes, UserItemAffinity, UserUserAffinity)
{
    Remove duplicate items from InputSet (using ItemHashCodes)
    For every item I in InputSet
        For every user U
            Score += A * ItemScore[I, U] * (1 + UserUserAffinity[CurrentUser,U])
        RankedItems[I].rank = (B * Score) * (C * (1 + UserItemAffinity[I, CurrentUser]))
        If InputSet is ranked
            RankedItems[I].rank *= D * InputSet[I].rank
}
```

The system computes the sum of user actions against each item in the set, weighted by the affinity of the current user to the other users and then computes the weighted product of that sum, the affinity of the user to the item, and the existing rank of each item (if it was provided). The weights reflect the relative importance of user behavior directly against the items vs. the predictability of user interest vs. the effectiveness of the original input ranking. The output is a ranking for each unique item in the set.

Collection Ranker 760

This algorithm is invoked on a set of collections, which is either unranked (a CollectionSet) or ranked (a RankedCollections set) and also gets CollectionScore. The algorithm is:

```
CollectionRanker(InputSet, CollectionScore, UserUserAffinity, UserCollectionAffinity)
{
  For every collection C in InputSet {
    Score = 0
    For every user U
      Score += A * CollectionScore[C, U] * (1 + UserUserAffinity[CurrentUser, U])
    RankedCollections[C].rank =   (B * Score) *
                                  (D * (1 + UserCollectionAffinity[I, CurrentUser))
    if InputSet is ranked
      RankedCollections[C] .rank *= E * InputSet[C].rank
  }
}
```

The system computes the sum of user actions against each collection, weighted by the affinity of the current user to the other users and then computes the weighted product of that sum, the affinity of the user to the collection, and the existing rank of each collection (if it was provided). The weights reflect the relative importance of user behavior directly against the collections vs. the predictability of user interest vs. the effectiveness of the original collection ranking. The output is a ranking for each collection in the input set.

People Ranker 730

This algorithm is invoked on a set of people, which is either unranked (a PeopleSet) or ranked (a RankedPeople set) and also gets UserUserAffinity and UserInfluence. The algorithm is:

```
PeopleRanker(InputSet, UserUserAffinity, UserInfluence)
{
  For every user U in InputSet
    RankedPeople[U].rank =   (A * UserInfluence[U]) *
                             (B * (1 + UserUserAffinity[CurrentUser, U]))
  If InputSet is ranked
    RankedPeople[U].rank *= C * InputSet[U].rank
}
```

For each of the users being ranked, the system computes the weighted product of their influence on other users, the affinity of the current user to the other users, and the existing rank of that user (if it was provided). The weights reflect the relative importance of influence, affinity, and the effectiveness of the original ranking. The output is a ranking for each user in the input set.

Query Completion Ranker 770

This algorithm is invoked on a partial query string, and computes the set of completions for it (suggested full queries the user might have in mind) and also gets QueryCount, UserQueryAffinity, and the InvertedIndex. This algorithm returns up to COMPLETION_MAX ranked query completions. COMPLETION_MAX may be defined by a user or an administrator of the system. The algorithm is:

```
QueryCompletionRanker(QueryPrefix, QueryCount, InvertedIndex)
{
   RankedQueries =   set of queries in QueryCount that begin with QueryPrefix
                     rank for query Q = (A * QueryPrefix[Q].count) +
                                        (B * (1 + UserQueryAffinity[Q, CurrentUser]))
   if (number of queries in RankedQueries < COMPLETION_MAX) {
      QueryLexemes = set of lexemes in InvertedIndex that begin with QueryPrefix
      Sort QueryLexemes by the number of times the lexeme appears in the index
      Copy from QueryLexemes into RankedQueries until you reach
        COMPLETION_MAX or have copied them all. Assign each the rank
        A* (count of appearances of lexeme in index)
   }
}
```

The system computes query completions from the set of queries that have already been executed and from textual analysis of the inverted index. In some cases, the system biases towards the former, but fills out the potential query list from the latter as needed to reach the desired number of completions. The rank for previously executed queries is a weighted sum of the number of times the query has been executed and the affinity of the current user to each query. The rank for matching lexemes is the count of that lexeme's appearances, weighted accordingly. The output is a ranked set of query completions.

Figure 21:
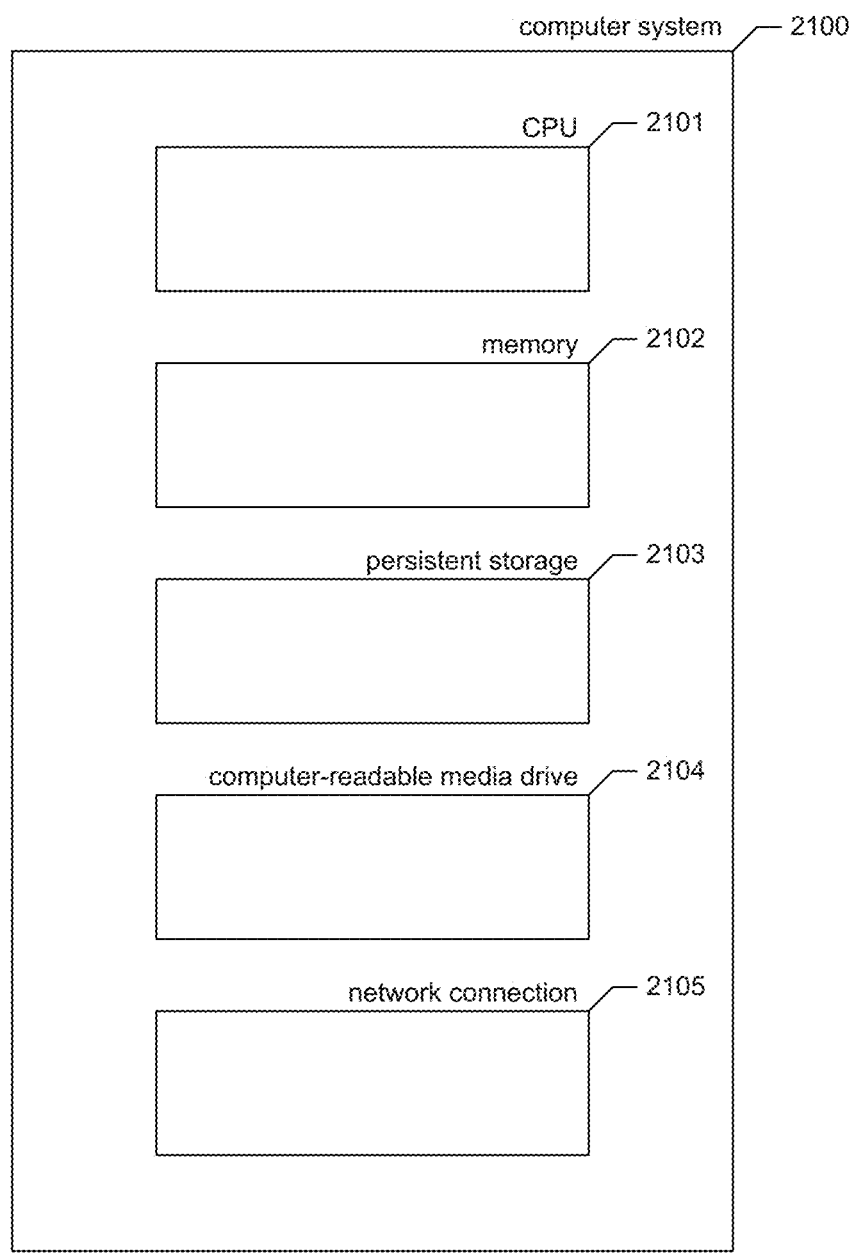
FIG. 21 is a block diagram illustrating some of the components that may be incorporated in at least some of the computer systems and other devices on which the system operates and interacts with in accordance with some examples of the disclosed technology.

FIG. 21 is a block diagram illustrating some of the components that may be incorporated in at least some of the computer systems and other devices on which the system operates and interacts with in some examples. In various examples, these computer systems and other devices 2100 can include server computer systems, desktop computer systems, laptop computer systems, netbooks, tablets, mobile phones, personal digital assistants, televisions, cameras, automobile computers, electronic media players, and/or the like. In various examples, the computer systems and devices include one or more of each of the following: a central processing unit (CPU) 2101 configured to execute computer programs; a computer memory 2102 configured to store programs and data while they are being used, including a multithreaded program being tested, a debugger, an operating system including a kernel, and device drivers; a persistent storage device 2103, such as a hard drive or flash drive configured to persistently store programs and data; a computer-readable storage media drive 2104, such as a floppy, flash, CD-ROM, or DVD drive, configured to read programs and data stored on a computer-readable storage medium, such as a floppy disk, flash memory device, a CD-ROM, or a DVD; and a network connection 2105 configured to connect the computer system to other computer systems to send and/or receive data, such as via the Internet, a local area network, a wide area network, a point-to-point dial-up connection, a cell phone network, or another network and its networking hardware in various examples including routers, switches, and various types of transmitters, receivers, or computer-readable transmission media. While computer systems configured as described above may be used to support the operation of the disclosed techniques, those skilled in the art will readily appreciate that the disclosed techniques may be implemented using devices of various types and configurations, and having various components. Elements of the disclosed systems and methods may be described in the general context of computer-executable instructions, such as program modules, executed by one or more computers or other devices. Generally, program modules include routines, programs, objects, components, data structures, and/or the like configured to perform particular tasks or implement particular abstract data types and may be encrypted. Moreover, the functionality of the program modules may be combined or distributed as desired in various examples. Moreover, display pages may be implemented in any of various ways, such as in C++ or as web pages in XML (Extensible Markup Language), HTML (HyperText Markup Language), JavaScript, AJAX (Asynchronous JavaScript and XML) techniques or any other scripts or methods of creating displayable data, such as the Wireless Access Protocol (WAP).

The following discussion provides a brief, general description of a suitable computing environment in which the invention can be implemented. Although not required, aspects of the invention are described in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable storage media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a computer-readable propagation medium or a computer-readable transmission medium (e.g., electromagnetic wave(s), a sound wave, etc.) over a period of time, or they may be provided on any analog or digital network (packet switched, circuit switched, or other scheme). Non-transitory computer-readable media include tangible media such as hard drives, CD-ROMs, DVD-ROMs, and memories such as ROM, RAM, and Compact Flash memories that can store instructions and other computer-readable storage media. Transitory computer-readable media include signals on a carrier wave such as an optical or electrical carrier wave and do not include hardware devices.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. For example, while several of the examples provided above are described in the context of slides and slide decks, one of ordinary skill in the art will recognize that these techniques can be applied to other types of documents and individual pages or units thereof, such as word processing documents, web pages, spreadsheets, images, and so on. Details of the system may vary considerably in the specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. For example, although examples described herein relate specifically to slides and slide decks, one of ordinary skill in the art will recognize that the disclosed techniques can be applied to other types of content, such as pages and word processing documents, cells and spreadsheets, records and databases, and so on.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims. Accordingly, the invention is not limited except as by the appended claims.

We claim:

1. A computer-implemented method of collecting usage data and identifying information of interest within an organization, wherein the organization includes a structured body of users with associated roles within the organization and who have access to information items, the method comprising:

determining use data that represents interactions with the information items by at least some of multiple users within the organization, the use data characterizing relationships among the information items with respect to users within the organization, wherein the information items include user data and collections of information items;

generating interest data indicating affinity among each of a plurality of sets of the information items based on the determined use data, wherein generating the interest data includes:

identifying, based on the use data, at least one set of two or more information items that have been interacted with by a plurality of the users in the organization, where each set of information items includes a first information item from the set of information items and a second, different information item from the set of information items, and where each of the plurality of users interacted with both the first information item and the second information item; and determining the affinity among the information items based on the identification of the at least one set of two or more information items;

for each of a plurality of the information items, determining at least one of a consumption, engagement, or influence value for the information item based on the generated use data and the generated interest data; and providing, for display, an indication of the determined values for the plurality of information items.

2. The computer-implemented method of claim 1, wherein information items include profiles of the users, a document, or a portion of a document, and wherein the organization is a business enterprise or a legal entity.

3. The computer-implemented method of claim 1:
wherein a relationship between a user and a respective information item corresponds to an activity performed by the user on the respective information item,
wherein the activity is querying, browsing, opening, viewing, editing, critiquing, bookmarking, liking, sharing, downloading, collecting, or curating the respective information item, and
wherein determining the use data includes tracking the activity.

4. The computer-implemented method of claim 3, wherein tracking the activity is performed using a web browser without downloading external software or documents.

5. The computer-implemented method of claim 1, further comprising determining a relationship between two users that corresponds to at least one of:
an organizational relationship between the two users with respect to the roles of the two users with the organization,
an activity performed by the two users together within the organization, or
a pair of relationships respectively between the two users and the same information item.

6. The computer-implemented method of claim 1, wherein the providing comprises:
providing a popularity of an information item,
providing a popularity of a collection of information items,
providing an authority of a user, or
providing the interest data.

7. The computer-implemented method of claim 6, further comprising determining the popularity of a first information item based on:
a number of activities performed on the first information item,
an authority of users who performed activities on the first information item, or
a popularity of collections of information items to which the first information item belongs.

8. The computer-implemented method of claim 6, further comprising determining the authority of a user based on a number of activities performed on information items created by the user.

9. The computer-implemented method of claim 6, further comprising determining the popularity of a collection of information items based on a number of activities performed on the information items in the collection.

10. The computer-implemented method of claim 1, further comprising:
for each of multiple versions of a respective information item:
presenting the version of the respective information item to a plurality of users within the organization,
measuring a level of engagement with the version of the respective information item by the plurality of users within the organization, and
comparing the measured levels of engagement.

11. The computer-implemented method of claim 1, further comprising determining an affinity between a first user and a second user based on one or more of a relationship between the first and second users and an interest indicated by the first user with respect to the second user.

12. The computer-implemented method of claim 1, further comprising determining an affinity between a first user and an information item based on: an affinity between the first user and a second user and a relationship between the second user and the information item, or an affinity between the first user and a collection to which the information item belongs.

13. The computer-implemented method of claim 1, further comprising determining an affinity between a user and a collection of information items based on a relationship between the user and the collection.

14. The computer-implemented method of claim 1, wherein the providing comprises providing usage and activity data for a particular information item.

15. The computer-implemented method of claim 1, wherein the providing comprises displaying aggregate usage and activity data for a spot or spotlist.

16. The computer-implemented method of claim 1, wherein the providing comprises providing aggregate usage and activity data for a user.

17. The computer-implemented method of claim 1, wherein measuring the affinity among the information items based on the determined use data comprises, for each of a plurality of pairs of users, calculating an affinity value for the pair of users based on a behavior similarity for the pair of users.

18. The computer-implemented method of claim 17, wherein measuring the affinity among the information items based on the determined use data further comprises:
for each of a plurality of pairs of users,
calculating the degree to which the pair of users is connected in a social graph; and
calculating a sum based on the calculated affinity value for the pair of users and the calculated the degree to which the pair of users is connected.

19. A computer-readable storage medium, excluding transitory signals and carrying instructions, that if executed by a computing system having a processor, cause the computing system to perform a method for collecting usage data and identifying information of interest within an organization, wherein the organization includes a structured body of users with associated roles within the organization and who have access to information items, the instructions comprising:

instructions for determining use data that represents interactions with the information items by at least some of multiple users within the organization, the use data characterizing relationships among the information items with respect to users within the organization, wherein the information items include user data and collections of information items;

instructions for generating interest data indicating affinity among each of a plurality of sets of the information items based on the determined use data, wherein generating the interest data includes:

identifying, based on the use data, at least one set of two or more information items that have been interacted with by a plurality of the users in the organization, where each set of information items includes a first information item from the set of information items and a second, different information item from the set of information items, and where each of the plurality of users interacted with both the first information item and the second information item; and determining the affinity among the information items based on the identification of the at least one set of two or more information items;

instructions for determining, for each of a plurality of the information items, an engagement value for the information item based on the generated use data and the generated interest data; and instructions for providing, for display, an indication of the determined values for the plurality of information items.

20. A system, having a memory and a processor, for collecting usage data and identifying information of interest within an organization, wherein the organization includes a structured body of users with associated roles within the organization and who have access to information items, the system comprising:

a component configured to determine use data that represents interactions with the information items by at least some of multiple users within the organization, the use data characterizing relationships among the information items with respect to users within the organization, wherein the information items include user data and collections of information items;

a component configured to generate interest data indicating affinity among each of a plurality of sets of the information items based on the determined use data, wherein generating the interest data includes:

identifying, based on the use data, at least one set of two or more information items that have been interacted with by a plurality of the users in the organization, where each set of information items includes a first information item from the set of information items and a second, different information item from the set of information items, and where each of the plurality of users interacted with both the first information item and the second information item; and determining the affinity among the information items based on the identification of the at least one set of two or more information items;

a component configured to, for each of a plurality of the information items, determine an influence value for the information item based on the generated use data and the generated interest data; and a component configured to provide, for display, an indication of the determined values for the plurality of information items.

* * * * *